United States Patent [19]

Yano

[11] Patent Number: 4,839,887

[45] Date of Patent: Jun. 13, 1989

[54] NODE APPARATUS FOR COMMUNICATION NETWORK HAVING MULTI-CONJUNCTION ARCHITECTURE

[75] Inventor: Takashi Yano, Tokyo, Japan

[73] Assignee: Ricoh Company, Ltd., Tokyo, Japan

[21] Appl. No.: 96,532

[22] Filed: Sep. 15, 1987

[30] Foreign Application Priority Data

Sep. 18, 1986 [JP] Japan .................................. 61-218023
Sep. 18, 1986 [JP] Japan .................................. 61-218026

[51] Int. Cl.⁴ ............................ H04B 9/00; H04J 3/26
[52] U.S. Cl. ......................................... 370/60; 370/94
[58] Field of Search ........................... 370/58, 60, 94; 340/825.52; 178/3

[56] References Cited

U.S. PATENT DOCUMENTS

| | | | |
|---|---|---|---|
| 4,276,643 | 6/1981 | Laprie et al. | 371/8 |
| 4,347,498 | 8/1982 | Lee et al. | 370/94 |
| 4,399,531 | 8/1983 | Grande et al. | 370/94 |
| 4,470,154 | 8/1985 | Yano | 455/607 |
| 4,516,272 | 6/1986 | Yano | 455/607 |
| 4,672,373 | 6/1987 | Mori et al. | 370/16 |

OTHER PUBLICATIONS

A Local Network Design Using Fiber Optics, Hewlett-Packard Co. California USA; Randal NEFF, IEEE 1981, pp. 64-69.

Primary Examiner—Douglas W. Olms
Assistant Examiner—Min Jung Kim
Attorney, Agent, or Firm—Oblon, Fisher, Spivak, McClelland & Maier

[57] ABSTRACT

A node apparatus is used in a communication network having a multi-conjunction architecture. The communication network has a plurality of transmission paths each coupling one node apparatus to another node apparatus or a terminal device. The node apparatus generally comprises an input port, an output port, and a control part for controlling the coupling of input channels of the input port to output channels of the output port. The control part couples a first receiving input channel which receives a signal first out of the input channels to all of the output channels excluding an output channel having a channel number corresponding to that of the first receiving input channel, so as to broadcast the signal.

21 Claims, 29 Drawing Sheets

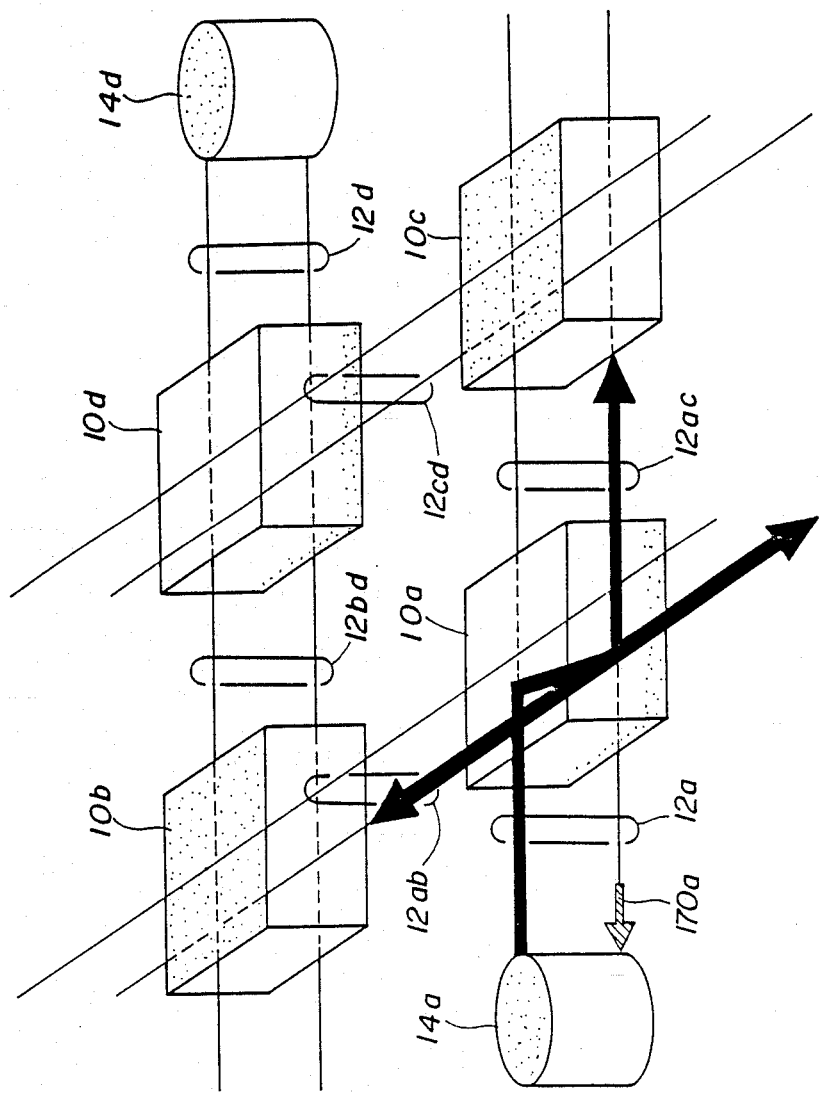

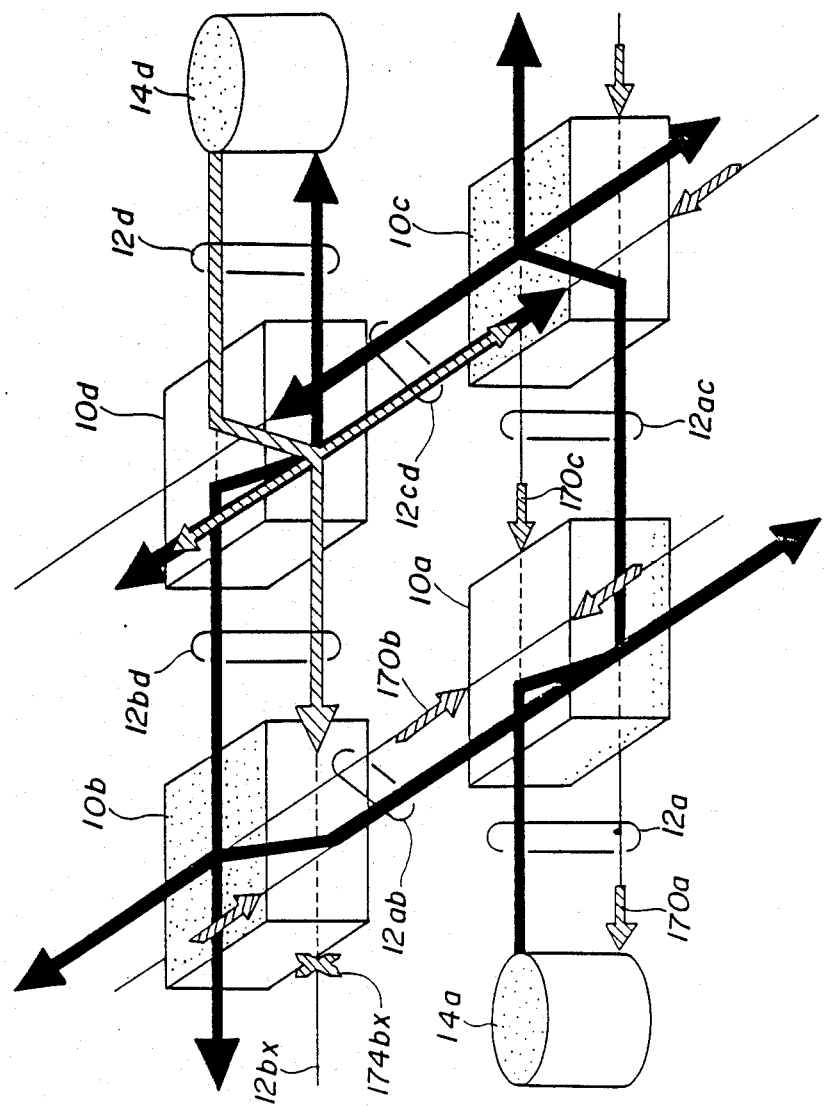

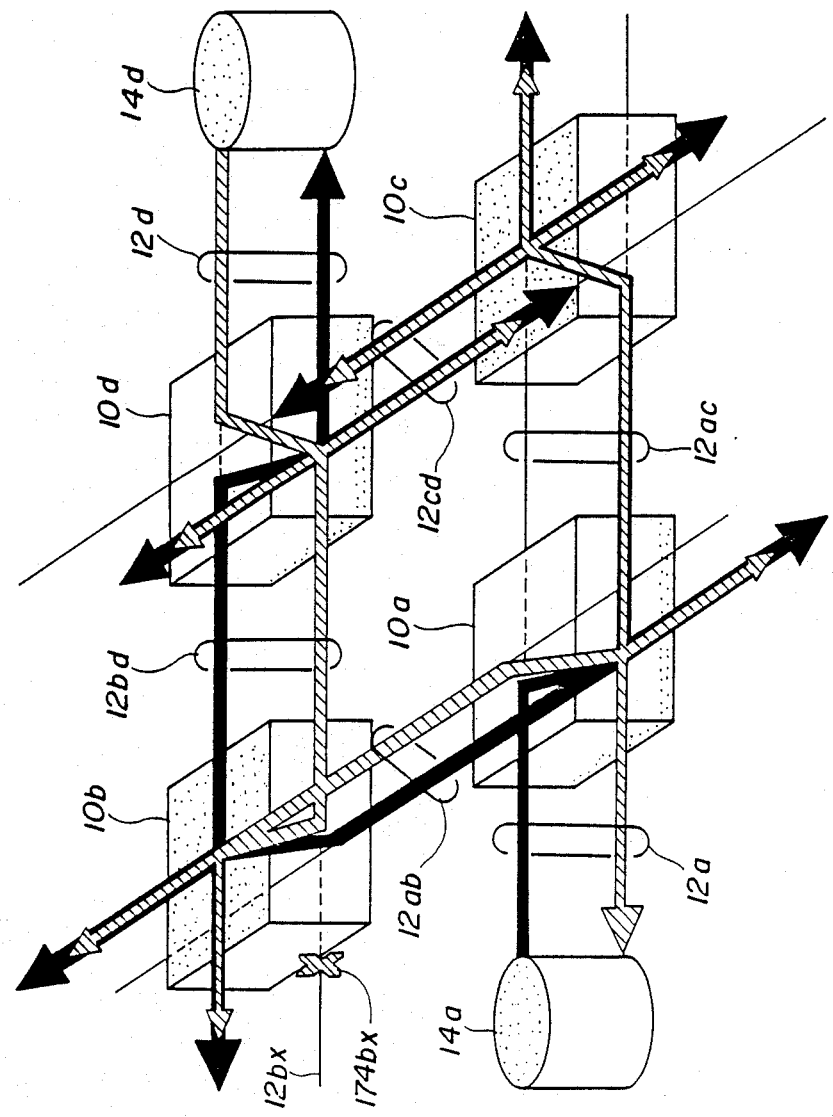

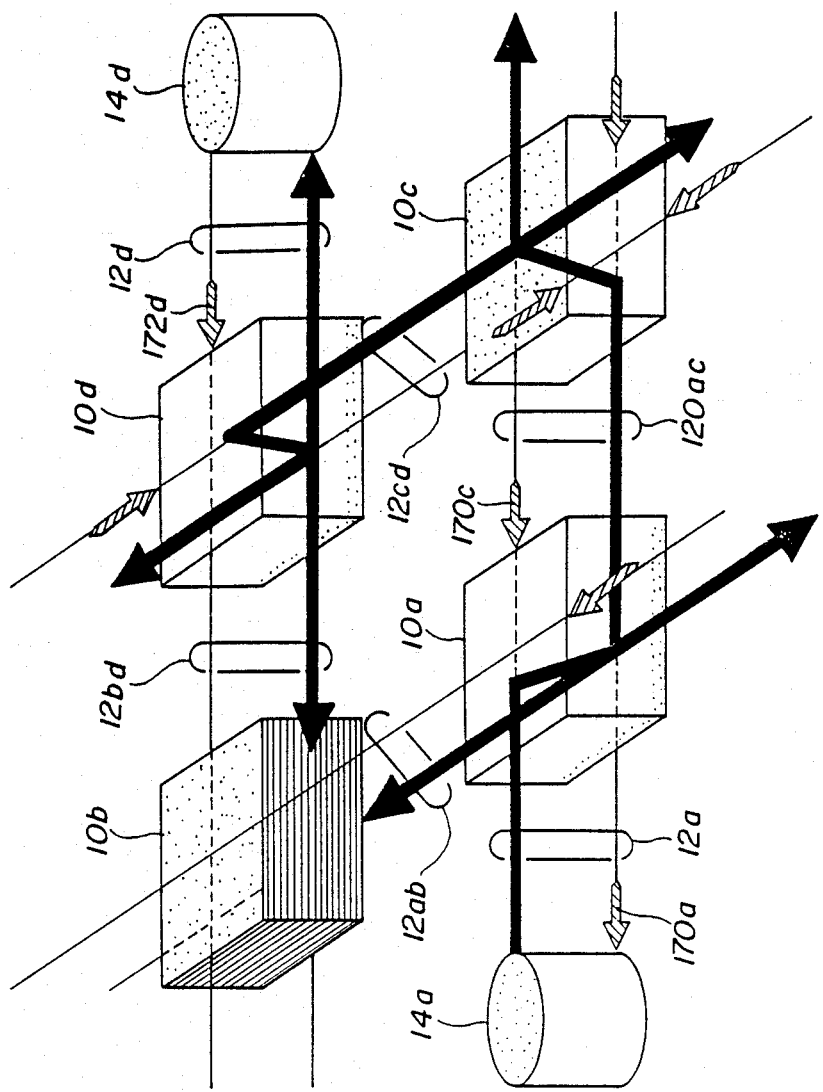

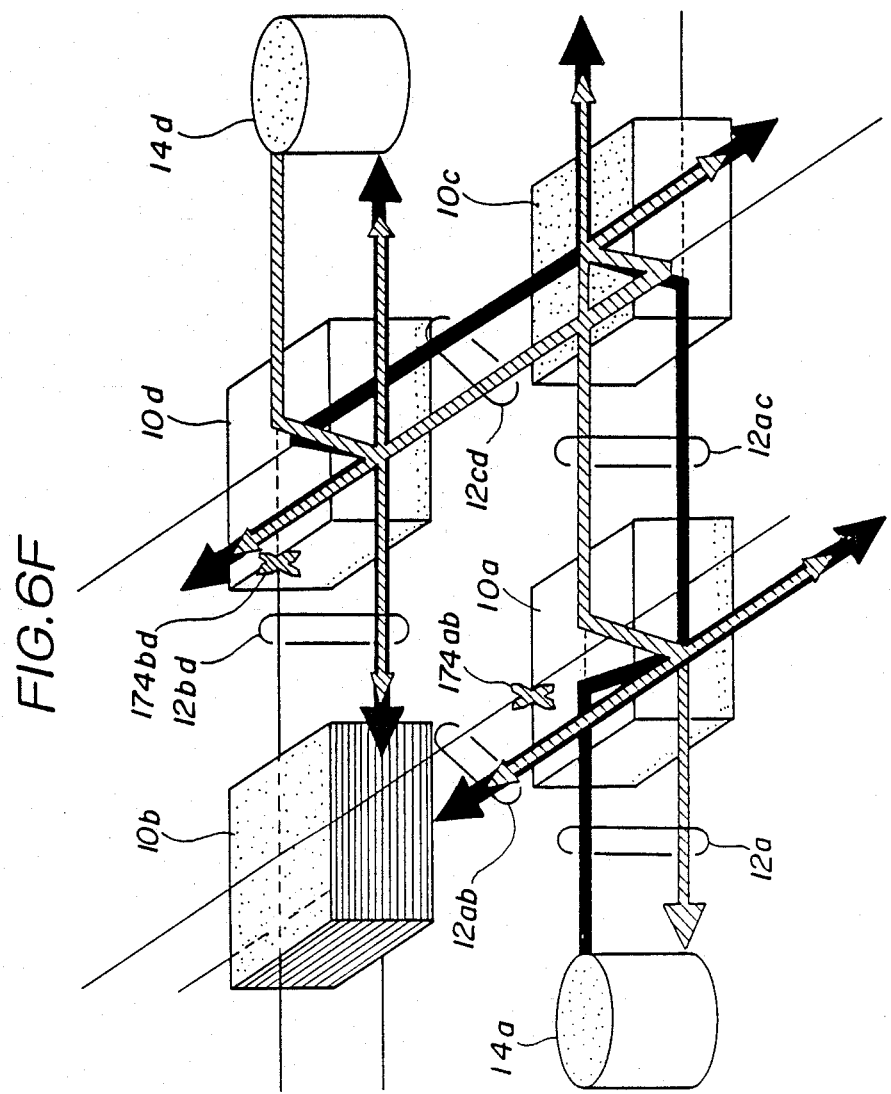

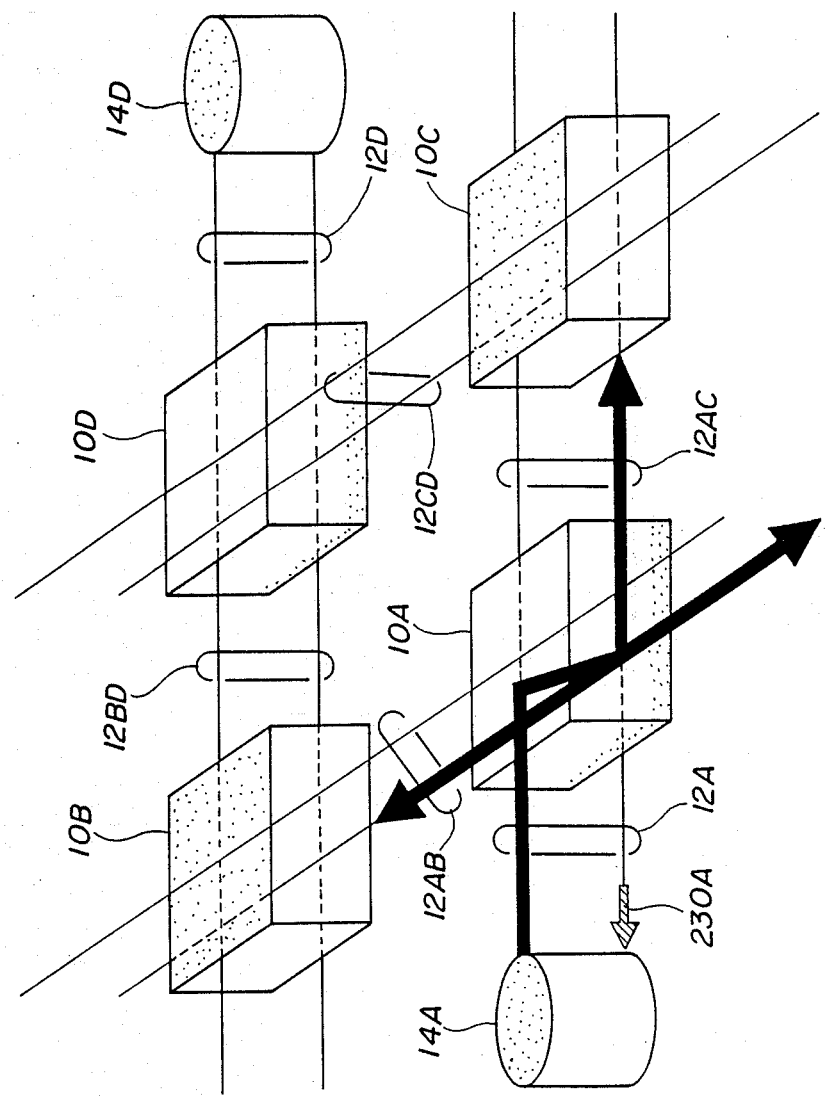

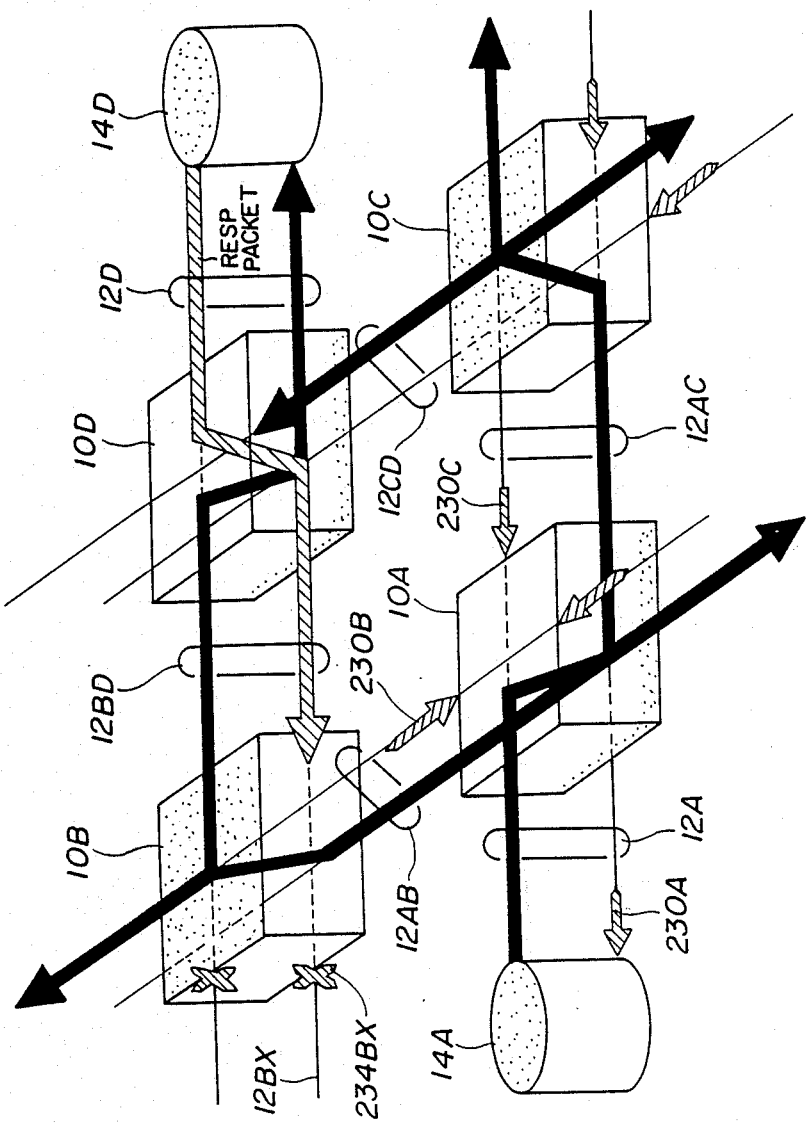

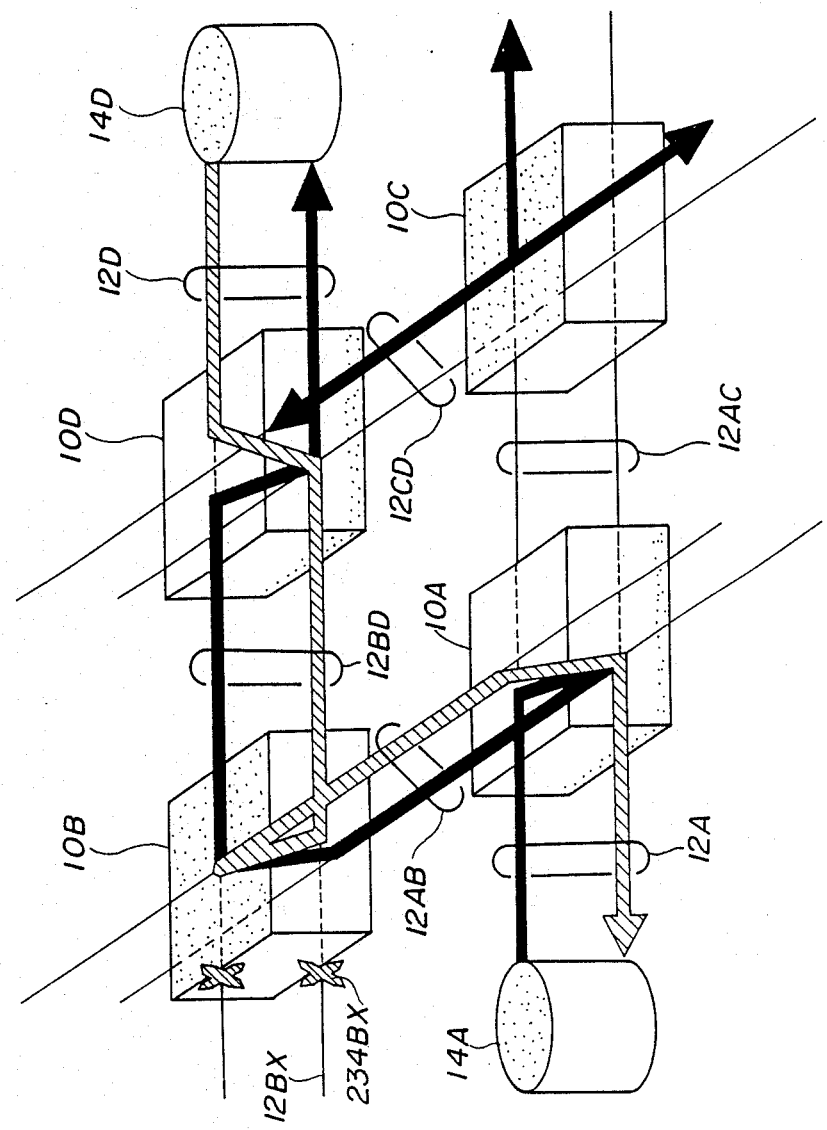

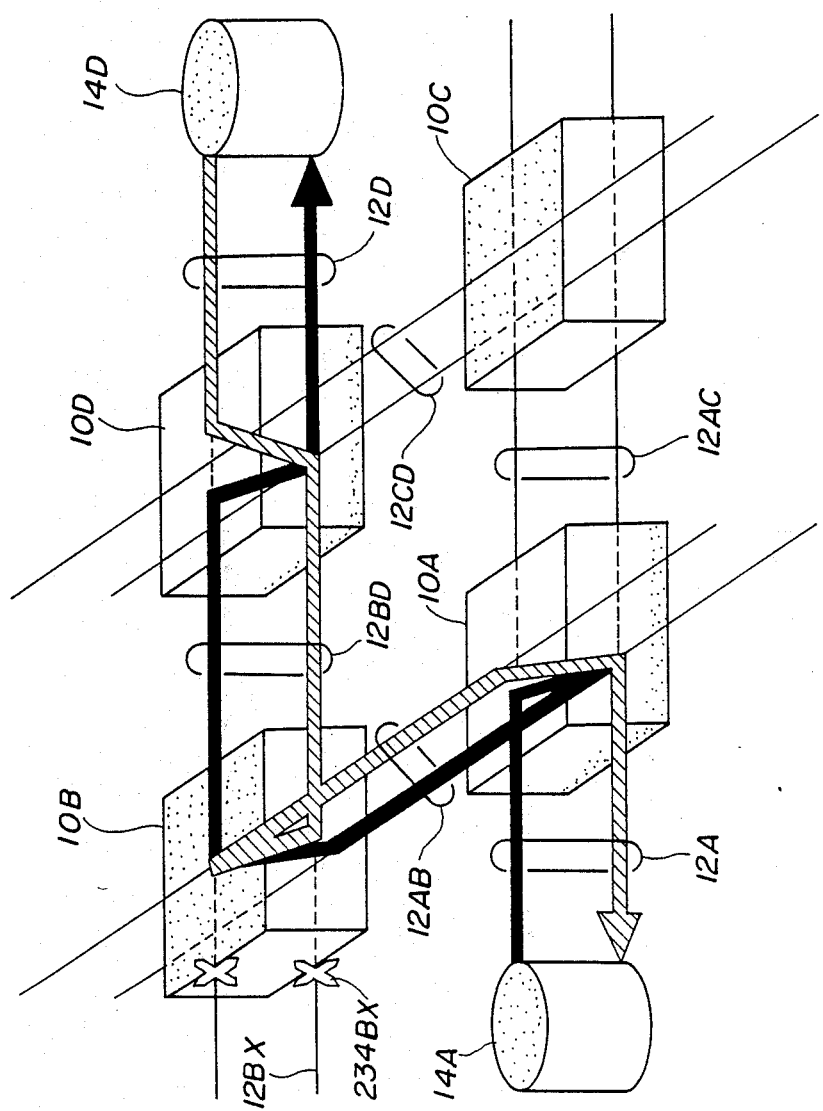

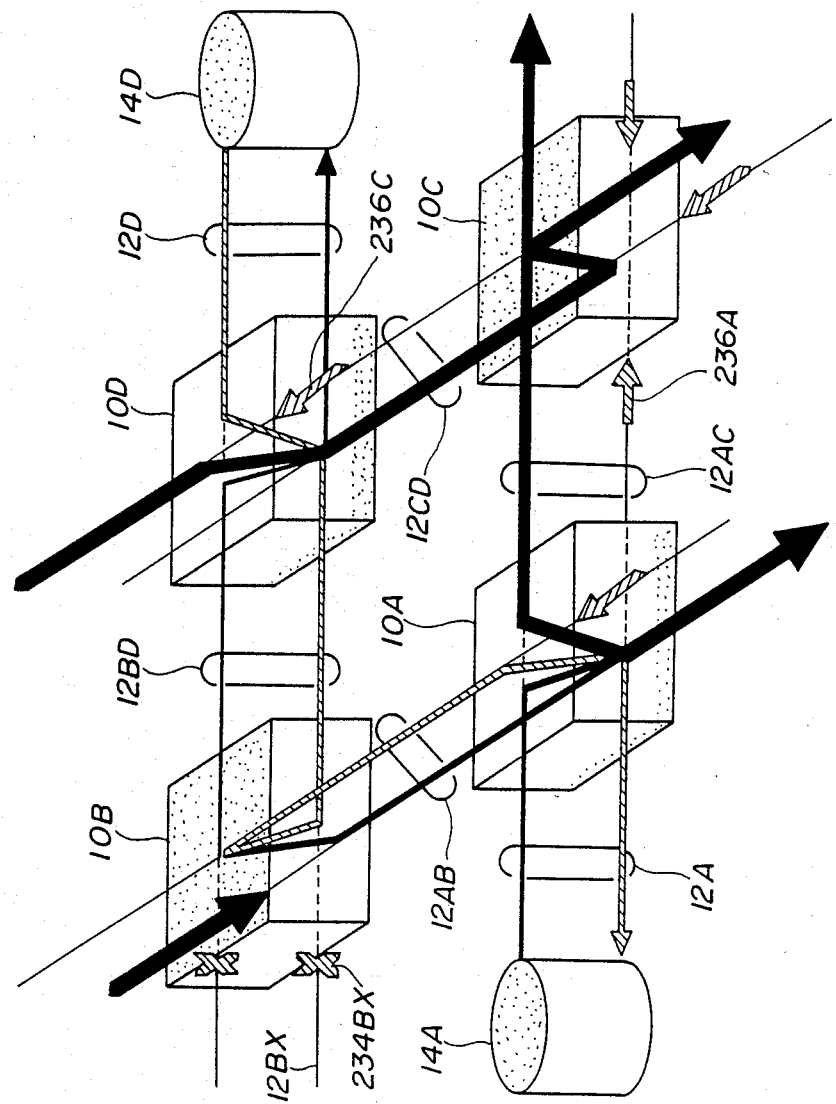

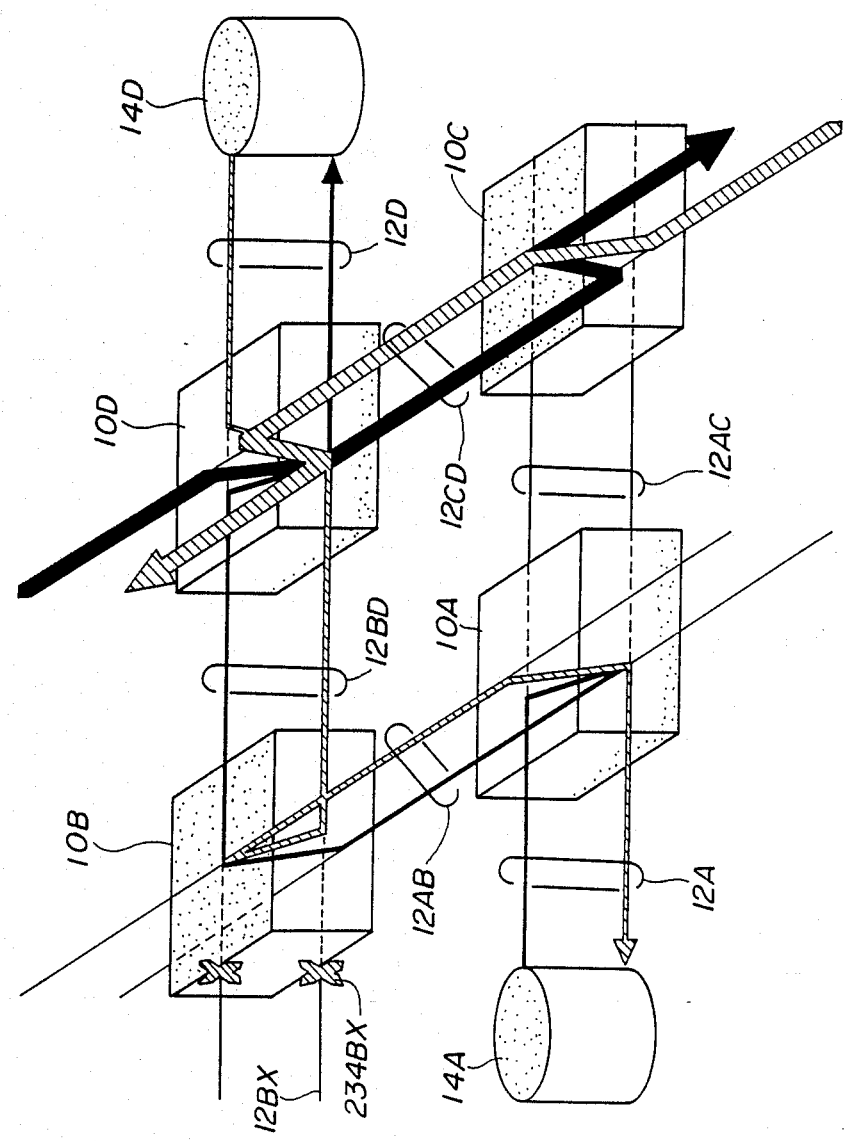

NODE APPARATUS FOR COMMUNICATION NETWORK HAVING MULTI-CONJUNCTION ARCHITECTURE

BACKGROUND OF THE INVENTION

The present invention generally relates to node apparatuses, and more particularly to a node apparatus of a communication network employing a multi-conjunction architecture.

Conventionally, as communication networks applicable to local area networks (LANs), there are a network employing a carrier sense multiple access with collision detection (CSMA/CD) method using coaxial cables for buses as typified by an Ethernet (registered trademark), an optic star shaped network using optical fibers for buses, and an optic loop shaped network employing a time-division multiple access (TDMA) method. The network using optical fibers is less affected by noise caused by external electro-magnetic waves when compared to the network using coaxial cables.

In the network using buses such as the Ethernet, a fault in a node apparatus will not cause the entire system to go down, but the entire system will go down when a node apparatus oscillates or a cable breaks. In the case of the star shaped network, the entire system will go down when a fault occurs in a central part of the network. Furthermore, in the case of the loop shaped network, there is a possibility of the entire system going down when a fault occurs in a node apparatus or a link. It is possible to provide the loop in duplicate, but it would make the construction of the node apparatus extremely complex.

On the other hand, as communication networks applicable to multi-media communications, there are a carrier sense multiple access (CSMA) base-band LAN typified by the Ethernet, a broad-band LAN, and a TDMA base-band LAN in combination with a digital private branch exchange (DPBX).

The CSMA base-band LAN is suited for the communication of information which has a short packet length such as data information and text information and is generated in a burst. However, in the case of the multi-media communication where the message length is not limited and in the case where the data is generated continuously, a collision of data occurs frequently. For this reason, it is impossible to obtain a high throughput, and the CSMA base-band LAN is not best suited for the multi-media communication.

The broad-band LAN is not best suited for the multi-media communication due to the following reasons. In other words, the capacity of the broadband LAN is insufficient, there is a limit to the expansion of the system, and the system is expensive.

On the other hand, the TDMA base-band LAN is more suited for the multi-media communication than the CSMA base-band LAN and the broad-band LAN. However, there is also a limit to the expansion of the system, and the system is expensive. Especially when the TDMA base-band LAN is applied to the multi-media communication, the cost of the system becomes substantial.

Accordingly, the present inventor has previously proposed a lattice communication network analogous to nerve cells of a living body in a U.S. Pat. No. 4,516,272. According to this proposed lattice network, each node apparatus has a plurality of input and output channels and is used as a communication control element, and such node apparatuses are coupled in a multi-conjunction to constitute the lattice network. Each node apparatus transfers one of incoming digital signals according to a first-come-first-served logic (hereinafter referred to as a first-come-first-output logic).

The proposed lattice network has a large degree of freedom of network topology because of the multi-conjunction architecture. Thus, the survivability of data is high. In other words, even when a fault occurs in a path of the network, it is possible to carry out the communication through other paths. Furthermore, it is possible to select optimum paths for the communication because each node apparatus transfers the incoming digital signals according to the first-come-first-output logic.

However, when it takes time to select the optimum paths and fix a communication path which is to be used and a large number of long message packets are to be transmitted, it is only possible to obtain a throughput which is in the range of the throughput obtainable in the CSMA base-band LAN. Therefore, the communication is not completely carried out in the full duplex. In addition, when the returning of a responding signal is slow, the detection of failure of the communication becomes slow, and it is impossible to effectively carry out the backoff such as controlling a re-transmission. Accordingly, there is a demand to realize a full duplex communication also in a multi-channel system in which a node apparatus simultaneously couples to a plurality of channels.

On the other hand, when the contention method is employed in setting a link, the collision of the message packets prevents the realization of a high throughput. The probability that the collision is generated is proportional to a maximum network propagation delay time, that is, the time it takes for a message packet sent from a sending (source) terminal device to reach a farthermost terminal device.

According to the proposed lattice network, the setting of the link is determined by the contention method using the first-come-first-output logic. Because the lattice network has the multi-conjunction architecture, the maximum network propagation delay time is intrinsically short. In addition, even when the collision is generated, the communication is completed if the destination terminal device is located inside a boundary determined by the collision, and a plurality of communications may be completed when the collision occurs. However, in order to sufficiently improve the throughput, it is desirable that the maximum network propagation delay time is further shortened.

The function of setting the link for the input channel to which the signal is first received is realized at a high speed by wired logic. But when the link is set after detecting the incoming message packet, there is a possibility that a front portion of the message packet will drop out even when the wired logic is used since a circuit delay is inevitably introduced by the detection. The dropout of the front portion of the message packet occurs at each node apparatus, and the dropout is accumulated every time the message packet passes through a node apparatus. This accumulation of the dropout is one of the causes limiting the further reduction of the maximum network propagation delay time.

In the case of the half duplex communication, the input channels are coupled to all of the output channels in an initial state of the line. According to a system previously proposed in a Japanese Patent Application No. 60-170429, an input channel which receives an input signal first is detected when input signals are received by the input channels, and the other input channels are disconnected from the output channels. As a result, it is possible to prevent the front portion of the message packet from dropping out by an amount corresponding to the time it takes to determine the input channel which receives the input signal first received according to the first-come-first-output logic.

However, according to the previously proposed lattice networks, a responding signal is restricted from being transferred before the transfer of a sending signal is completed, as may be seen from a Japanese Patent Application No. 60-170427, for example. In other words, although the full duplex communication is basically possible, no responding signal such as acknowledge or not acknowledge is transferred while the first message packet is being transferred. Accordingly, the communication is not completely carried out in the full duplex. In addition, when the returning of the responding signal is slow, the detection of failure of the communication becomes slow, and it is impossible to effectively carry out the backoff such as controlling the re-transmission. In a multi-channel system in which a node apparatus simultaneously couples to a plurality of channels, the algorithm of each node apparatus becomes complex and the construction of the node apparatus becomes extremely complex.

In order to obtain a high data survivability in the lattice network, it is important that the effects of faults are minimized and the trouble shooting is carried out quickly. There are three major faults, namely, a first fault caused by the fault in the node apparatus itself, a second fault in the sending path, and a third fault in a receiving path. In the proposed lattice networks, the probability that the first and second faults will occur is extremely small.

However, when the third fault occurs, a serious problem occurs when the first sending signal sent from the node apparatus reaches a destination terminal device. In other words, the first sending signal reaches the destination terminal device because there is no fault in the sending path between the node apparatus and the destination terminal device, but because there is a fault in the receiving path between the destination terminal device and the node apparatus, the responding signal from the destination terminal device such as the acknowledge signal cannot be sent back to the sending (source) terminal device. The lattice network will then re-transmit the first sending signal, but the same sending path will be selected because it is the optimum path and there is no fault in the selected optimum path. As a result, the destination terminal device is again unable to send back the responding signal to the node apparatus because of the fault in the receiving path. The proposed lattice networks are unable to obviate this problem.

SUMMARY OF THE INVENTION

Accordingly, it is a general object of the present invention to provide a node apparatus of a communication network employing a multi-conjunction architecture, in which the problems described heretofore are eliminated.

Another and more specific object of the present invention is to provide a node apparatus of a communication network employing a multi-conjunction architecture, which has a relatively simple construction and is designed so that a complete full duplex communication can be carried out, the dropout of the front portion of the message packet is prevented and the probability of the collision of message packets is reduced. According to the node apparatus of the present invention, it is possible to improve the throughput of the entire communication network using the node apparatus. In addition, it is possible to accurately discriminate a fault in the communication network and take appropriate measures so that a path containing the fault will not be used.

Still another object of the present invention is to provide a node apparatus for a communication network having a multi-conjunction architecture, where the communication network has a plurality of transmission paths each coupling one node apparatus to another node apparatus or a terminal device. The node apparatus comprises an input port comprising a plurality of input channels connected to the transmission paths, an output port comprising a plurality of output channels connected to the transmission paths, a switching gate part for coupling the input and output channels of the input and output ports, and a control part for controlling the switching gate part to selectively couple the input and output channels. The control part comprises a first input detecting part coupled to the input port for detecting a first receiving input channel which receives a signal first out of the input channels, a first time-out part for timing a second predetermined time after a first predetermined time elapses from the detection of the first receiving input channel in the first input detecting part, and an input signal detecting part coupled to the first time-out part for detecting whether or not the input channels receive a signal from the transmission paths. The control part controls the switching gate part to maintain the input and output channels coupled to each other in an initial state so that each input channel is coupled to all of the output channels other than an output channel having a corresponding channel number. The control part controls the switching gate part responsive to the detection of the first receiving input channel in the first input detecting part so that all of the input channels other than the first receiving input channel are disconnected from the output channels, thereby transferring the signal received by the first receiving input channel to all of the output channels other than an output channel having a channel number corresponding to that of the first receiving input channel. The input signal detecting part supervises whether or not a signal is received by predetermined input channels having channel numbers corresponding to those of the output channels which transfer the signal received by the first receiving input channel and detects a specific one of the predetermined input channels which receives no signal during the second predetermined time. The control part controls the switching gate part responsive to the detection of the specific input channel in the input signal detecting part so that the specific input channel is coupled to the output channels including the output channel having the channel number corresponding to that of the first receiving input channel.

According to the node apparatus of the present invention, it is possible to simultaneously transfer a sending signal and a returning signal. For this reason, it is possible to detect the completion of the communication by detecting the returning signal, and the control of the retransmission and the continuing of the transmission can be carried out at an early stage. No problems will occur even when the message packet of the first sending signal is long. Thus, the throughput of the system is improved, that is, the data transmission rate of the network employing the node apparatus of the present embodiment is improved. In addition, only a destination terminal device can receive the sending signal in the normal manner, and other terminal devices receive the overlapping sending signal and the returning signal and cannot discriminate the information content due to the interference caused by the overlap. For this reason, the secrecy of the transmission to these other terminal devices is maintained. In addition, in case the sending signal terminates but the returning signal still continues, these other terminal devices can detect that the network is in use.

A further object of the present invention is to provide a node apparatus for a communication network having a multi-conjunction architecture, where the communication network has a plurality of transmission paths each coupling one node apparatus to another node apparatus or a terminal device. The node apparatus comprises an input port comprising a plurality of input channels connected to the transmission paths, an output port comprising a plurality of output channels connected to the transmission paths, a switching gate part for coupling the input and output channels of the input and output ports, and a control part for controlling the switching gate part to selectively couple the input and output channels. The control part comprises a first input detecting part coupled to the input port for detecting a first receiving input channel which receives a signal first out of the input channels, a first time-out part for timing a second predetermined time after a first predetermined time elapses from the detection of the first receiving input channel in the first input detecting part, and an input signal detecting part coupled to the first time-out part for detecting whether or not the input channels receive a signal from the transmission paths. The control part controls the switching gate part to maintain the input and output channels coupled to each other in an initial state so that each input channel other than input channels included in a fixed communication path is coupled to all of the output channels other than an output channel having a corresponding channel number. The control part controls the switching gate part responsive to the detection of the first receiving input channel in the first input detecting part so that all of the input channels other than the first receiving input channel are disconnected from the output channels, thereby transferring the signal received by the first receiving input channel to all of the output channels other than an output channel having a channel number corresponding to that of the first receiving input channel. The input signal detecting part supervises whether or not a signal is received by predetermined input channels having channel numbers corresponding to those of the output channels which transfer the signal received by the first receiving input channel, so as to detect specific ones of the predetermined input channels which receive no signal during the second predetermined time and to detect a certain one of the specific input channels which receives a signal after the second predetermined time. The control part controls the switching gate part responsive to the detection of the certain input channel in the input signal detecting part so that the certain input channel is coupled to the output channel having the channel number corresponding to that of the first receiving input channel and the first receiving input channel is coupled to an output channel having a channel number corresponding to that of the certain input channel, thereby a communication path being fixed between the input and output ports. Each of the input channels other than the first receiving input channel and the certain input channel is coupled to all of the output channels other than output channels having channel numbers corresponding to those of the first receiving input channel and the certain input channel.

According to the node apparatus of the present invention, it is possible to simultaneously transfer a sending signal and a returning signal. For this reason, it is possible to detect the completion of the communication by detecting the returning signal, and the control of the re-transmission and the continuing of the transmission can be carried out at an early stage. In addition, only a destination terminal device can receive the sending signal in the normal manner, and other terminal devices receive the overlapping sending signal and the returning signal and cannot discriminate the information content due to the interference caused by the overlap. Therefore, the secrecy of the transmission to these other terminal devices is maintained. On the other hand, it is possible to carry out the half duplex communication by use of the same node apparatus, that is, the same algorithm may be used for the full duplex communication and the half duplex communication. Moreover, the combined use of the full duplex communication and the half duplex communication is permitted. Finally, the communication sequence which must be followed by the terminal device is simple, and network interface may be made compact and produced at a low cost. Therefore, it is possible to realize by use of the node apparatus a communication system which is highly feasible and is especially suited for carrying out the full duplex communication.

Other objects and further features of the present invention will be apparent from the following detailed description when read in conjunction with the accompanying drawings.

BRIEF DESCRIPTION OF THE DRAWINGS

FIGS. 6A through 6F are diagrams for explaining the sequence of the communication made in a lattice communication network using four node apparatuses of the first embodiment;

FIGS. 19A through 19G are diagrams for explaining the sequence of the communication made in a lattice communication network using four node apparatuses of the second embodiment.

DETAILED DESCRIPTION

Figure 1:
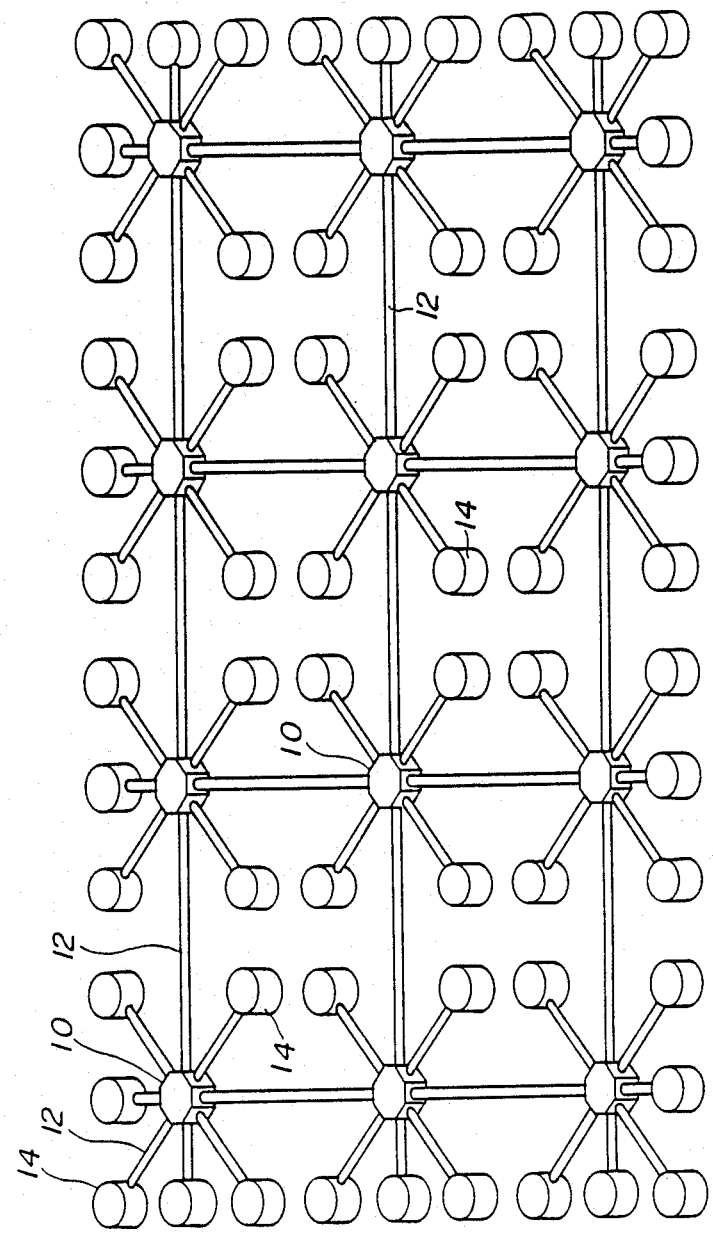
FIG. 1 shows a communication network employing the multi-conjunction architecture to which the node apparatus according to the present invention may be applied.

First, a description will be given on a first embodiment of the node apparatus according to the present invention, by referring to a communication network employing the multi-conjunction architecture to which the node apparatus of the present invention may be applied. In FIG. 1, each node apparatus 10 according to the present invention is coupled to other node apparatuses 10 and/or terminal devices 14 through a transmission path 12 in two or three dimensions to constitute a lattice communication network. However, the node apparatus 10 according to the present invention is applicable to any communication network employing the multi-conjunction architecture such as a linear communication network and a loop shaped communication network.

There is no limit to the number of input and output channels of the node apparatus 10. Hence, there is no limit to the number of node apparatuses 10 and/or terminal devices 14 which may be coupled to the node apparatus 10 through the transmission path 12, provided that the number is within the capacity of the input and output channels of the node apparatus 10. It is possible to constitute the entire network by a single node apparatus 10. In addition, it is possible to provide a plurality of node apparatuses 10 on a single printed wiring board and treat the wiring board as a single node apparatus, so as to essentially increase the capacity of the input and output channels.

In the present embodiment, the terminal device 14 can receive and transmit data asynchronously. For example, the terminal device 14 is a processing system such as a personal computer, a service station such as a filing station and a print station, and the like. It is desirable although not essential, that the data is transmitted in the form of message packets. As will be described later, it is desirable although not essential, that the terminal device 14 is designed for the full duplex communication and sends out a responding signal immediately after receipt of a sending signal (message packet) intended for the terminal device 14.

For example, the transmission path 12 is an optical transmission path constituted by optic fibers or an electrical transmission path constituted by twisted pair wire, coaxial cable and the like. In the present embodiment, the data is transmitted in analog or digital form, and the full duplex communication is carried out in the network. The transmission path 12 between the node apparatus 10 and the terminal device 14 may be designed for the half duplex communication. It is possible to provide a plurality of transmission paths 12 between the node apparatuses 10 depending on the traffic.

Figure 2:
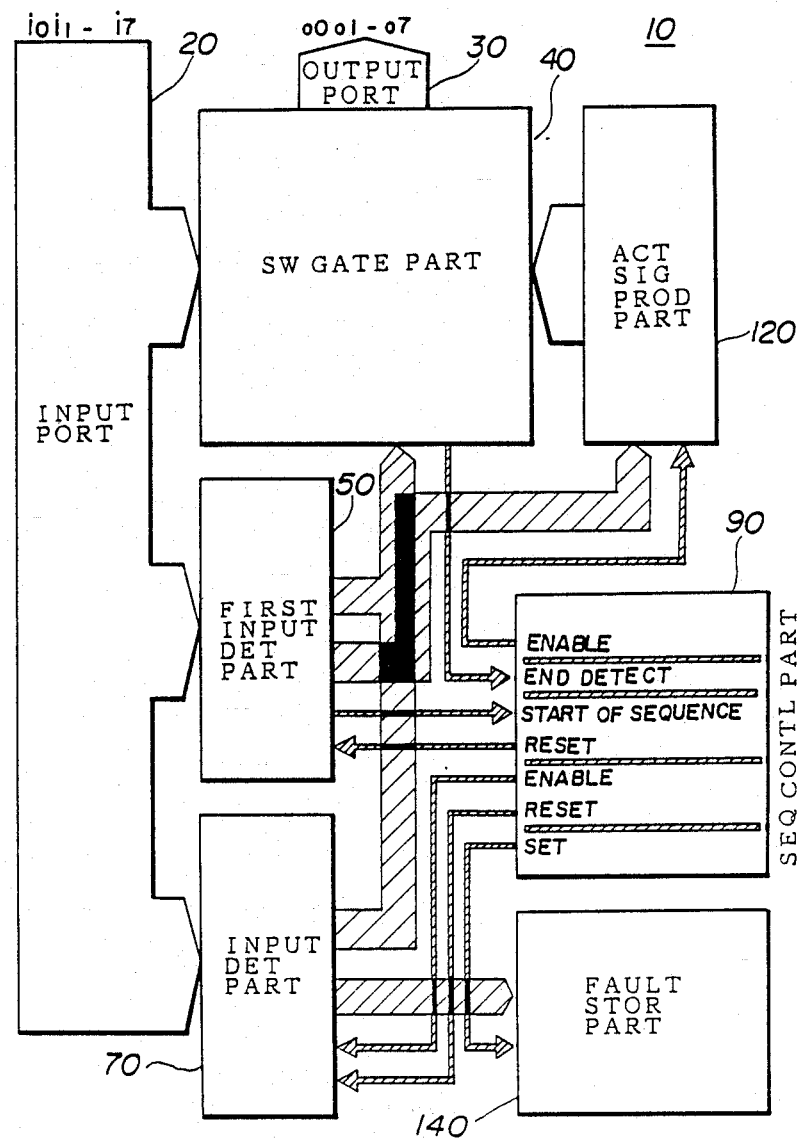
FIG. 2 is a system block diagram showing the first embodiment of the node apparatus according to the present invention.

FIG. 2 shows the first embodiment of the node apparatus 10. The node apparatus 10 generally comprises an input port 20, an output port 30, a switching gate part 40, a first input signal detecting part 50, an input signal detecting part 70, a sequence control part 90, an active signal producing part 120 and a fault storage part 140.

The input port 20 is connected to receiving lines of the transmission path 12, while the output port 30 is connected to sending lines of the transmission path 12. The input port 20 is coupled to the output port 30 through the switching gate part 40. In the present embodiment, the input port 20 comprises eight receiving or input channels i0 through i7, and the output port 30 comprises eight sending or output channels o0 through o7. Hence, in the present embodiment, it is possible to connect up to eight node apparatuses 10 and/or terminal devices 14 to one node apparatus 10 through the transmission path 12. A pair of input channel and output channel having a corresponding channel number is coupled to another node apparatus 10 (or terminal device 14).

Figure 3:
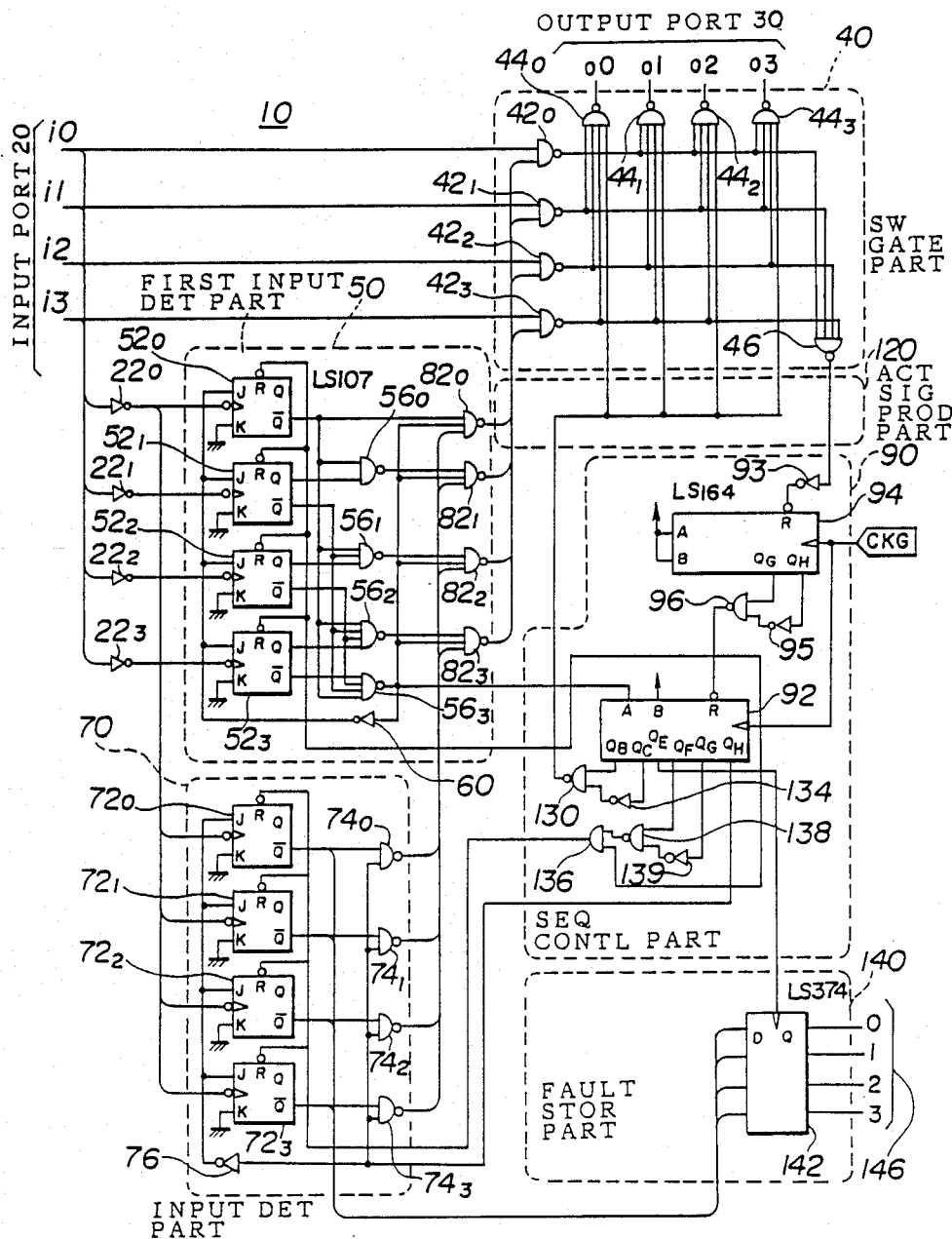
FIG. 3 is a system circuit diagram showing an embodiment of the circuit construction of the node apparatus shown in FIG. 2 for four input and output channels.

The switching gate part 40 selectively couple an arbitrary one of the input channels i0 through i7 to arbitrary ones of the output channels o0 through o7. FIG. 3 shows an embodiment of the node apparatus 10 shown in FIG. 2 for four input and output channels for convenience' sake so as to simplify the description thereof. As shown in FIG. 3, the switching gate part 40 comprises four 2-input NAND gates $42_0$ through $42_3$, four 4-input NAND gates $44_0$ through $44_3$, and a 4-input NAND gate 46 which are connected as shown. An output of one of the NAND gates $42_0$ through $42_3$ which is supplied with an input signal from one input channel is connected to each of the NAND gates $44_0$ through $44_3$ excluding the NAND gate which is connected to an output channel having a channel number corresponding to that of the one input channel. In other words, an output of the NAND gate $42_0$ which is supplied with an input signal from the input channel i0, for example, is connected to each of the NAND gates $44_0$ through $44_3$ excluding the NAND gate $44_0$ which is connected to the output channel o0 having a channel number corresponding to that of the input channel i0. In addition, the outputs of the NAND gates $42_0$ through $42_3$ are supplied to the NAND gate 46.

Returning now to the description of FIG. 2, the input port 20 is also coupled to the first input signal detecting part 50 and the input signal detecting part 70. The first input signal detecting part 50 detects the input signals from the input channels i0 through i7 and discriminates which input signal is received first, that is, which input channel receives the input signal first, according to the first-come-first-output logic. In FIG. 3, the first input signal detecting part 50 comprises four JK flip-flops $52_0$ through $52_3$, four NAND gates $56_0$ through $56_3$, an inverter 60 and four 3-input NAND gates $82_0$ through $82_3$ which are connected as shown. The input signals from the input channels i0 through i3 are supplied to clock terminals of the flip-flops $52_0$ through $52_3$ through respective inverters $22_0$ through $22_3$.

The flip-flops $52_0$ through $52_3$ constitute a circuit for holding the states of the input signals from the input channels. The 2-input NAND gate $56_0$, the 3-input NAND gate $56_1$ and the 4-input NAND gate $56_2$ constitute a circuit for assigning priorities to output signals of the flip-flops $52_0$ through $52_3$. The 4-input NAND gate $56_3$ and the inverter 60 constitute a circuit for holding the states of the flip-flops $52_0$ through $52_3$ by supplying a low-level signal to J-input terminals of all of the flip-flops $52_0$ through $52_3$ responsive to the input signal supplied to one of the flip-flops $52_0$ through $52_3$.

The input signal detecting part 70 detects whether or not an input signal is received by the input port 20. In FIG. 3, the input signal detecting part 70 comprises four JK flip-flops $72_0$ through $72_3$, four 2-input NAND gates $74_0$ through $74_3$ and an inverter 76 which are connected as shown. The input signals from the input channels i0 through i3 are supplied to clock terminals of the flip-flops $72_0$ through $72_3$ through the respective inverters $22_0$ through $22_3$.

The output signals of the first input signal detecting part 50 and the input signal detecting part 70 are supplied to the switching gate part 40 through the four 3-input NAND gates $82_0$ through $82_3$ of the first input signal detecting part 50. That is, the $\bar{Q}$-output of the flip-flop $52_0$, the output of the NAND gate $56_3$ and the output of the NAND gate $74_0$ are passed through the NAND gate $82_0$, and the output of the NAND gate $82_0$ is supplied to the NAND gate $42_0$. The outputs of the NAND gates $56_0$, $56_3$ and $74_1$ are passed through the NAND gate $82_1$, and the output of the NAND gate $82_1$ is supplied to the NAND gate $42_1$. The outputs of the NAND gates $56_1 56_3$ and $74_2$ are passed through the NAND gate $82_2$, and the output of the NAND gate $82_2$ is supplied to the NAND gate $42_2$. In addition, the outputs of the NAND gates $56_2$, $56_3$ and $74_3$ are passed through the NAND gate $82_3$, and the output of the NAND gate $82_3$ is supplied to the NAND gate $42_3$.

The active signal producing part 120 produces an active signal indicating that the node apparatus 10 is operating normally and is active. The active signal has no restrictions except for the signal length thereof. The signal length of the active signal is set to a value which is longer than a minimum time required to operate the flip-flops $72_0$ through $72_3$ of the input signal detecting part 70 and terminates within the length of an active detection time constant which will be described later. In FIG. 3, the active signal producing part 120 simply has the function of supplying an output enable signal of a NAND gate 130 within the sequence control part 90 to each of the NAND gates $44_0$ through $44_3$ as the active signal.

The fault storage part 140 stores one or more input channels in which a fault is detected. The fault storage part 140 comprises a flip-flop 142 supplied with the outputs of the flip-flops $72_0$ through $72_3$ within the input signal detecting part 70.

The switching gate part 40, the first input signal detecting part 50, the input signal detecting part 70, the active signal producing part 120 and the fault storage part 140 are respectively controlled by the sequence control part 90. In FIG. 3, the sequence control part 90 comprises two shift registers 92 and 94, four inverters 93, 95, 134 and 139, two 2-input NAND gates 96, 130 and 138, and a 2-input NAND gate 136 which are connected as shown. A system clock signal CKG is supplied to clock terminals of the shift registers 92 and 94. As will be described later, the shift register 92 constitutes a time-out circuit for timing the active detection time constant and an input signal detection time constant, while the shift register 94 constitutes a time-out circuit for timing a communication end detection time constant.

In an initial state where no communication is made between the input and output channels of the node apparatus 10, the NAND gates $42_0$ through $42_3$ of the switching gate part 40 are open and signals can pass through the node apparatus 10 because the input port 20 and the output port 30 are coupled through the switching gate part 40. In the present embodiment, the output signal level of the NAND gate $56_3$ becomes low when no input signal is received by the input channels i0 through i4 and the corresponding flip-flops $52_0$ through $52_3$ are reset, and consequently, a low-level signal is supplied to each of the NAND gates $82_0$ through $82_3$. Therefore, high-level signals are supplied to the NAND gates $42_0$ through $42_3$ from the respective NAND gates $82_0$ through $82_3$ to open the NAND gates $42_0$ through $42_3$.

In the initial state, when the input signal is supplied to one of the input channels i0 through i3 (i0 through i7 in FIG. 2), the first input signal detecting part 50 detects which one of the input channels i0 through i3 receives the input signal first according to the first-come-first-output logic. Hereunder, the input channel which receives the input signal first will simply be referred to as a first receiving input channel. One of the flip-flops $52_0$ through $52_3$ which is coupled to the first receiving input channel is set, while the other remaining flip-flops remain inactive. In case input signals are applied simultaneously to a plurality of input channels, the input channel having the highest priority is considered to be the first receiving input channel. In the present embodiment, the input channel i0 has the highest priority while the input channel i7 has the lowest priority. Hence, in FIG. 3, the priorities of the input channels i0 through i3 are determined by the operation of the NAND gates $56_0$ through $56_2$.

The output signals of the NAND gates $82_0$ through $82_3$ indicative of the first receiving input channel are supplied to the switching gate part 40, and thus, those ones of the NAND gates $42_0$ through $42_3$ connected to the input channels other than the first receiving input channel are closed. As a result, only the first receiving input channel is coupled to those output channels other than the output channel having a channel number corresponding to that of the first receiving input channel. In other words, a broadcast communication is made by transferring the input signal which is received by the first receiving input channel of the input port 20 to all of the output channels of the output port 30 except for the output channel having the channel number corresponding to that of the first receiving input channel.

Therefore, in the initial state, each input channel is constantly coupled to all of the output channels other than an output channel having a channel number corresponding thereto, and when the input signal is supplied to one of the input channels, the other remaining input channels are disconnected from the output channels. For this reason, even when there is a time delay in the operations of the first input signal detecting part 50 and the switching gate part 40, a dropout of a front portion of the input signal will not occur.

When the first input signal detecting part 50 detects the first receiving input channel, the sequence control part 90 is activated by a high-level output signal of the NAND gate $56_3$. The sequence control part 90 starts a time supervision of the active detection time constant and the input signal detection time constant by the shift register 92. In this state, the NAND gate 130 produces a low-level enable signal for a predetermined time due to outputs $Q_B$ and $Q_C$ of the shift register 92 having mutually different logic levels. Hence, the output low-level enable signal of the NAND gate 130, that is, the active signal produced from the active signal producing part 120, is passed through the NAND gates $44_0$ through $44_3$ and is supplied to each of the output channels o0 through o3.

The active detection time constant (first predetermined time) is provided to exclude input signals received by input channels other than the first receiving input channel. Accordingly, even when the input signal from the same source as the input signal received by the first receiving input channel is received by another input channel or when another input signal from another source is received by another input channel and a collision occurs, the input signals received by the input channels other than the first receiving input channel will be excluded.

The length of the active detection time constant is set to a time which is essentially equal to a sum of a propagation delay time for a return trip covering a maximum tolerable distance between the node apparatus 10 and another node apparatus 10 or the terminal device 14 and the duration of the active signal. Normally, a slight margin time is added to the length of the active detection time constant. The input signal identical to that received by the first receiving input channel but obtained through a roundabout route is received by an input channel other than the first receiving input channel, the input signals from other sources are received by the input channels other than the first receiving input channel and the active signal is received from the active signal producing part 120, all within the length of the active detection time constant.

The input channels which receive the input signals within a first supervision time defined by the active detection time constant are stored in the flip-flops $72_0$ through $72_3$ of the input signal detecting part 70. When the first supervision time ends, a $Q_E$-output of the shift register 92 of the sequence control part 90 is supplied to a clock terminal of the flip-flop 142. As a result, out of the input channels i0 through i3, one or more input channels which receive no input signal during the first supervision time are stored into the flip-flop 142 as being faulty input channels or dormant input channels, because $\overline{Q}$-outputs of the flip-flops $72_0$ through $72_3$ are supplied to the flip-flop 142.

Next, the shift register 92 carries out the time supervision of the input signal detection time constant. The input signal detection time constant (second predetermined time) is provided to detect whether or not there is an input signal after the first supervision time defined by the active detection time constant. For example, the length of the input signal detection time constant is one bit in the case of the Manchester encoding, and is seven or more bits in the case of the encoding in which "0" is inserted into six consecutive "1"s in non-return-to-zero invert (NRZI). Normally, a slight margin time is added to the one or seven bits to make it two times longer, and the length of the input signal detection time constant is set to two bits or fourteen or more bits.

One or more input channels which receive an input signal within a second supervision time defined by the input signal detection time constant are stored in the flip-flops $72_0$ through $72_3$ of the input signal detecting part 70. When the second supervision time ends, a $Q_H$-output (enable signal) of the shift register 92 is supplied to the J-terminals of the flip-flops $72_0$ through $72_3$ through the inverter 76. As a result, one or more NAND gates out of the NAND gates $74_0$ through $74_3$ corresponding to the input channels which receive no input signal within the second supervision time are supplied with two high-level signals and therefore produce a low-level signal. Hence, one or more NAND gates out of the NAND gates $42_0$ through $42_3$ corresponding to the input channels which receive no input signal within the second supervision time are supplied with a high-level signal from the corresponding ones of the NAND gates $82_0$ through $82_3$. In other words, the one or more NAND gates out of the NAND gates $42_0$ through $42_3$ corresponding to the input channels which receive no input signal within the second supervision time are opened. Therefore, each input channel which receives no input signal within the second supervision time is coupled to all of the output channels o0 through o3 except for the output channel having a channel number corresponding thereto.

When one of the input channels which receives no input signal within the second supervision time thereafter receives an input signal, one of the NAND gates $42_0$ through $42_3$ corresponding to this one input channel produces a high-level signal. A signal indicating this is produced from the NAND gate 46 and is supplied to a reset terminal of the shift register 94 within the sequence control part 90 through the inverter 93.

When all of the signals supplied to the NAND gate 46 become high and a low-level signal is produced from the NAND gate 46, the shift register 94 is reset and starts to time the communication end detection time constant. When a third supervision time defined by the communication end detection time constant elapses, a low-level signal from the NAND gate 96 resets the flip-flops $52_0$ through $52_3$ of the first input signal detecting part 50, and a low-level signal from the NAND gate 136 resets the flip-flops $72_0$ through $72_3$ of the input signal detecting part 70.

The end of the communication may be detected from the input signal received by the first receiving input channel, so that a restore process is carried out when the input signal is no longer received by the first receiving input channel. Alternatively, it is possible to carry out the restore process when the input signal is no longer obtained either one of the first receiving input channel or the output channel coupled thereto. It is possible to detect that an input signal is no longer obtained at a channel when the logic value of the input signal remains the same (for example, "0") for the length of the communication end detection time constant.

The communication end detection time constant (third predetermined time) is provided to detect that there is no continuing signal and the communication is ended. The length of the communication end detection time constant is set to a time which is required to discriminate the true end of the communication from consecutive "0"s or "1"s in the case of the full duplex communication. Normally, a slight margin time is added to the length of the communication end detection time constant. For example, the length of the communication end detection time constant is one bit in the case of the Manchester encoding, and is seven or more bits in the case of the encoding in which "0" is inserted into six consecutive "1"s in NRZI. Normally, the length of the communication end detection time constant is made two times longer to add the slight margin time, that is, to two bits or fourteen or more bits.

When enabling both the full duplex communication and the half duplex communication, the length of the communication end detection time constant is set to a time which is essentially equal to a sum of a propagation delay time for a return trip covering the maximum tolerable distance between the node apparatus 10 and another node apparatus 10 or the terminal device 14 and a time it takes for the terminal device 14 to send a returning (or sending) signal after receipt of a sending (or returning) signal. Normally, a slight margin time is added to this length of the communication end detection time constant.

The data stored in the flip-flop 142 of the fault storage part 140 and indicating the faulty or dormant input channel can be obtained through output terminals 146. The data may be read out arbitrarily through the terminals 146 and displayed on a display device (not shown) for monitoring the location of the fault.

In the embodiment shown in FIG. 3, the active signal is outputted from all of the output channels o0 through o3 when the first receiving input channel is detected. This method of outputting the active signal is advantageous in that the circuit construction of the active signal producing part 120 and the like is simple. However, there is a possibility of interference caused by a partial overlap of the active signal and the input signal. Accordingly, it is possible to avoid this interference by increasing the length of the preamble of the message packet by an amount corresponding to the partial overlap, and this method is especially advantageous when the data transmission rate is slow.

Figure 4:
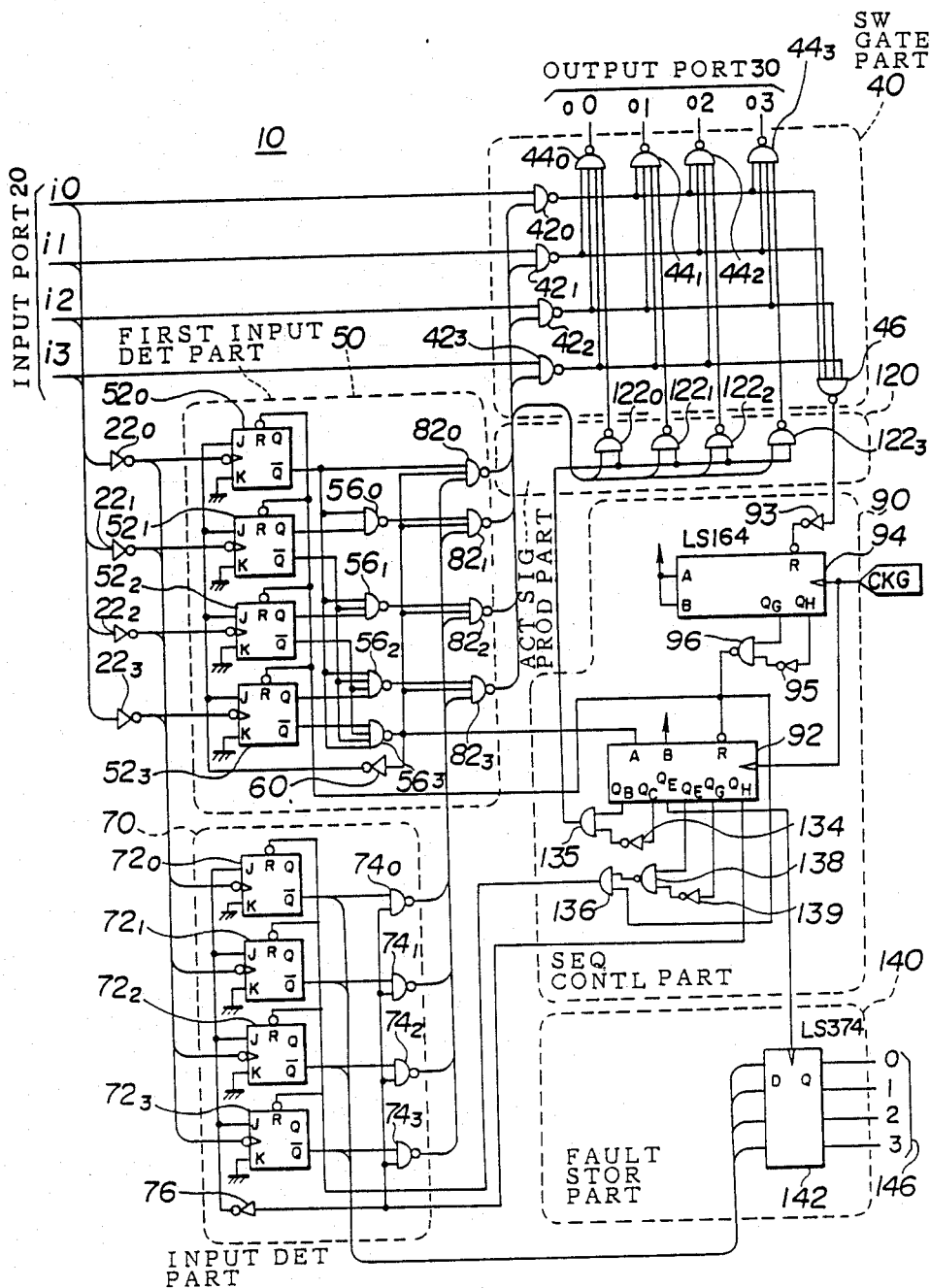
FIG. 4 is a system circuit diagram showing a first modification of the circuit construction of the node apparatus shown in FIG. 2 for four input and output channels.

Next, a description will be given on a first modification of the embodiment of the circuit construction of the node apparatus shown in FIG. 2 for four input and output channels, wherein the interference caused by the partial overlap of the active signal and the input signal is avoided, by referring to FIG. 4. In FIG. 4, those parts which are the same as those corresponding parts in FIG. 3 are designated by the same reference numerals, and a description thereof will be omitted. In this first modification, the active signal is outputted only from the output channel having the channel number corresponding to that of the first receiving input channel. For this reason, the active signal producing part 120 comprises four 2-input NAND gates $122_0$ through $122_3$ in correspondence with the output channels o0 through o3. Each of the NAND gates $122_0$ through $122_3$ are supplied with the output signal of an AND gate 135 within the sequence control part 90 and the output signals of the corresponding NAND gates $82_0$ through $82_3$.

In the first modification shown in FIG. 4, when the first receiving input channel is detected in the first input signal detecting part 50 and the sequence control part 90 is activated by the high-level output signal of the NAND gate $56_3$, the sequence control part 90 starts the time supervision of the active detection time constant and the input signal detection time constant by the shift register 92. In this state, the AND gate 135 produces a high-level enable signal for a predetermined time due to outputs $Q_B$ and $Q_C$ of the shift register 92 having mutually different logic levels. Hence, the output high-level enable signal of the AND gate 135, that is, the active signal, is passed through one of the NAND gates $122_0$ through $122_3$ corresponding to the first receiving input channel because one of the NAND gates $82_0$ through $82_3$ corresponding to the first receiving input channel produces a high-level signal. The active signal is thus supplied to one of the output channels o0 through o3 having the channel number corresponding to that of the first receiving input channel through one of the NAND gates $44_0$ through $44_3$ supplied with a low-level signal from the active signal producing part 120. Therefore, it is possible to prevent partial overlap of the input signal and the active signal, and the interference caused by the partial overlap is positively avoided.

Figure 5:
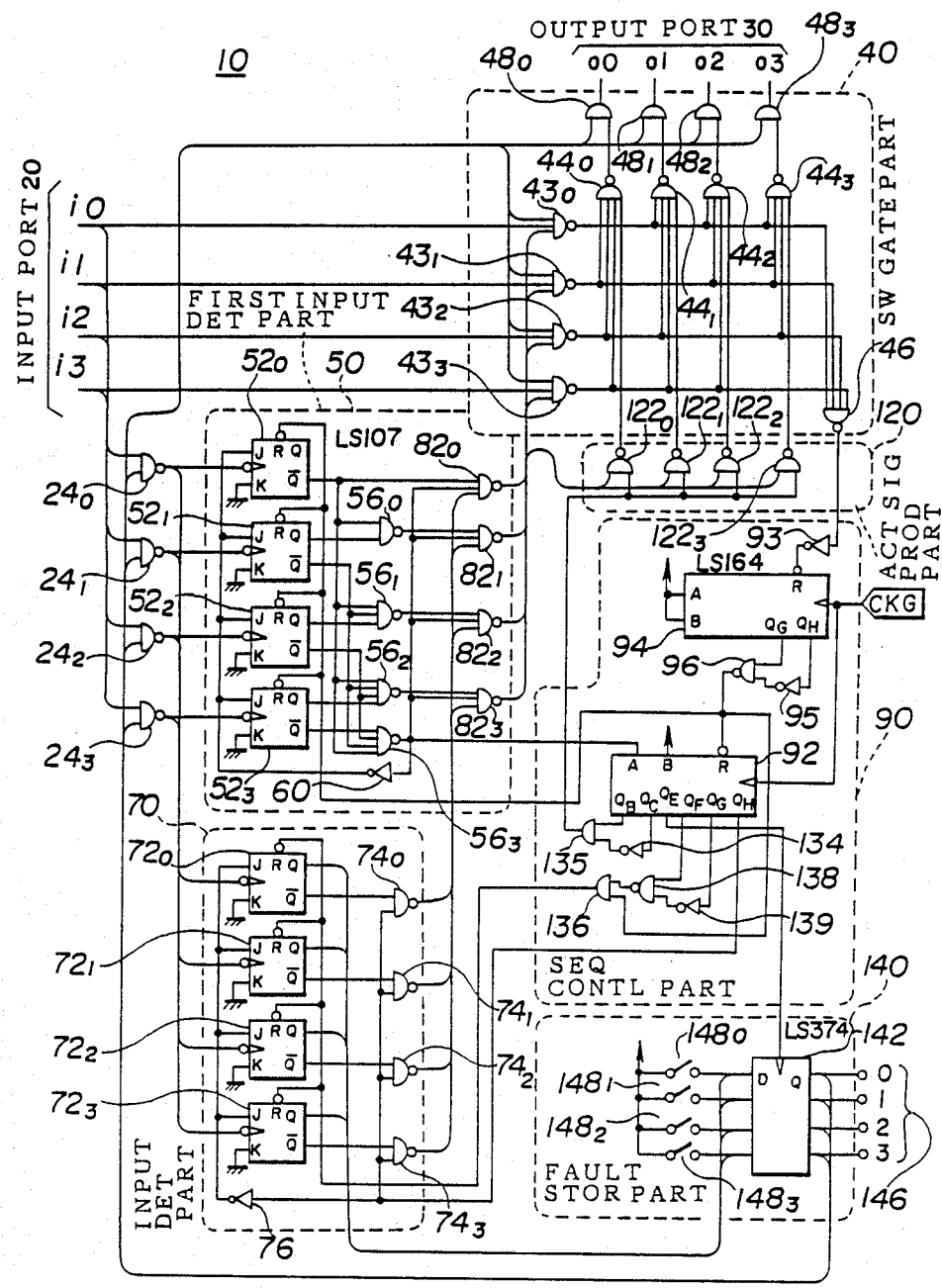
FIG. 5 is a system circuit diagram showing a second modification of the circuit construction of the node apparatus shown in FIG. 2 for four input and output channels.

FIG. 5 shows a second modification of the embodiment of the circuit construction of the node apparatus shown in FIG. 2 for four input and output channels, wherein the faulty or dormant input channel is closed, by referring to FIG. 5. In FIG. 5, those parts which are the same as those corresponding parts in FIG. 4 are designated by the same reference numerals, and a description thereof will be omitted. In the present modification, the circuit construction of the switching gate part 40, the fauls storage part 140 and the circuit parts related thereto are different from those of the first modification described before in conjuction with FIG. 4.

In the second modification, the output signals of the NAND gates $44_0$ through $44_3$ are not supplied directly to the corresponding output channels o0 through o3, but are supplied to the output channels o0 through o3 through respective 2-input AND gates $48_0$ through $48_3$. The four output signals of the flip-flop 142 within the fault storage part 140 are supplied to the corresponding AND gates $48_0$ through $48_3$. In addition, 3-input NAND gates $43_0$ through $43_3$ are provided in place of the 2-input NAND gates $42_0$ through $42_3$, and the four output signals of the flip-flop 142 within the fault storage part 140 are supplied to the corresponding NAND gates $43_0$ through $43_3$. The other two signals supplied to each of the NAND gates $43_0$ through $43_3$ are the same as those supplied to the NAND gates $42_0$ through $42_3$.

Furthermore, 2-input NAND gates $24_0$ through $24_3$ are connected to the respective input channels i0 through i3 instead of the inverters $22_0$ through $22_3$. The four output signals of the flip-flop 142 within the fault storage part 140 are supplied to the corresponding NAND gates $24_0$ through $24_3$.

Switches $148_0$ through $148_3$ are provided on the input side of the flip-flop 142 within the fault storage part 140 in correspondence with the input channels i0 through i3. The switches $148_0$ through $148_3$ are provided for the purpose of clearing the set state of the flip-flop 142. In other words, these switches $148_0$ through $148_3$ are used as reset switches for clearing (erasing) the data related to the corresponding prestored faulty input channel. For example, the switches $148_0$ through $148_3$ are manipulated when the corresponding faulty input channel is restored so as to clear the data related to the prestored faulty input channel.

In addition, when the terminal device connected to the input channel does not have the function of outputting the active signal, one of the switches $148_0$ through $148_3$ corresponding to this input channel may be manipulated to fix the corresponding input of the flip-flop 142 to a high level. In this case, the switches $148_0$ through $148_3$ are used as preset switches for preventing this input channel from being closed even when no active signal is detected.

The data indicative of the faulty or dormant input channel and stored in the flip-flop 142 of the fault storage part 140 are supplied to the corresponding NAND gates $24_0$ through $24_3$. In other words, a high-level signal is supplied to each one of the NAND gates $24_0$ through $24_3$ corresponding to the faulty or dormant input channel. As a result, the faulty or dormant input channel is excluded from the detection which determines which one of the input channels i0 through i3 receives the input signal first. At the same time, the high-level signal indicative of the faulty or dormant input channel is supplied to each one of the NAND gates $43_0$ through $43_3$ and each one of the AND gates $48_0$ through $48_3$ respectively corresponding to the faulty or dormant input channel. Therefore, the faulty or dormant input channel is inhibited from being coupled to the output channels other than the output channel having a channel number corresponding to that of the faulty of dormant input channel, and moreover, the input channels other than the faulty or dormant input channel are inhibited from being connected to the output channel having the channel number corresponding to that of the faulty or dormant input channel. Thus, the transmission path of the faulty or dormant input channel is closed.

Next, a description will be given on the sequence of the communication made in a lattice communication network using four node apparatuses 10 of the first embodiment described heretofore, by referring to FIGS. 6A through 6F. For convenience' sake, four node apparatuses 10a through 10d are coupled in the lattice form through transmission paths 12a, 12ab, 12ac, 12bd, 12cd and 12d each having four channels in FIGS. 6A through 6F. A terminal device 14a is coupled to the node apparatus 10a, and a terminal device 14d is coupled to the node apparatus 10d. In FIGS. 6A through 6F, a dot-pattern is provided on the transmitting side of each node apparatus or terminal device, a bold arrow indicates the flow of the sending signal, and an arrow with hatchings indicates the flow of the responding signal and the returning signal.

When carrying out the full duplex communication according to the present embodiment, the detection of the input signal and the control of the coupling between the input and output channels based on this detection are carried out in the following four basic steps.

Firstly, the lattice network is in the initial state, and in a first step shown in FIG. 6A, the sending (source) terminal device 14a, for example, transmits a sending signal in the form of the message packet. The sending signal includes a destination address indicative of the intended destination of the sending signal, and the intended destination is the terminal device 14d in this case. The sending signal is supplied to the node apparatus 10a through the transmission path 12a. In the initial state, each input channel of the node apparatus 10a is coupled to all of the output channels thereof except the output channel having a channel number corresponding thereto.

When the node apparatus 10a detects that the sending signal from the terminal device 14a is received first, the node apparatus 10a transfers the sending signal to all of the output channels thereof except the output channel having the channel number corresponding to that of the first receiving input channel which is connected to the transmission path 12a. In other words, the sending signal is broadcasted from the node apparatus 10a. In addition, the node apparatus 10a disconnects the input channels other than the first receiving input channel from the output channels thereof. In the case of the embodiment shown in FIG. 3, an active signal 170a is supplied to the transmission paths 12a, 12ab and 12ac connected to all of the output channels of the node apparatus 10a. In the case of the modifications shown in FIGS. 4 and 5, the active signal 170a is supplied to the output channel of the node apparatus 10a having the channel number corresponding to that of the first receiving input channel which is connected to the transmission path 12a.

Figure 6B:
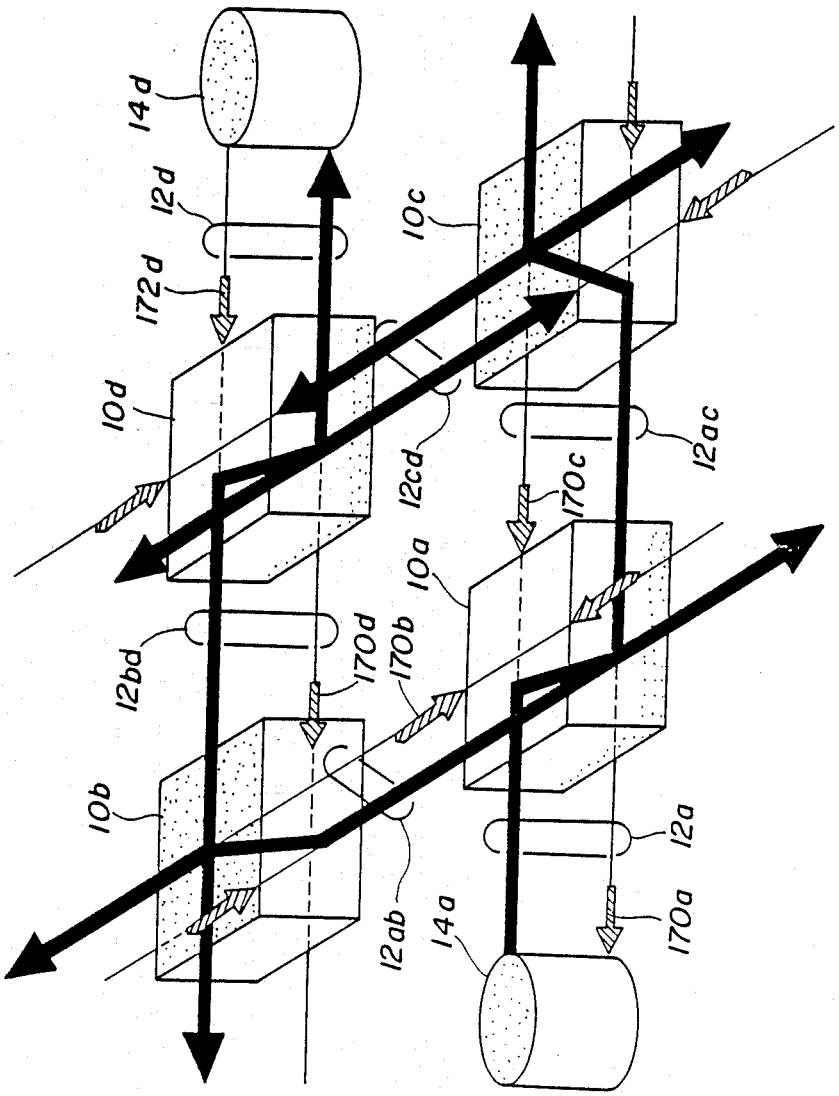

Next, in a second step shown in FIG. 6B, the node apparatus 10b receives the sending signal through the transmission path 12ab, the node apparatus 10c receives the sending signal through the transmission path 12ac, and the node apparatus 10d receives the sending signal through the transmission paths 12bd and 12cd. The node apparatuses 10b, 10c and 10d broadcast the sending signal similarly as in the case of the node apparatus 10a. In this case, the node apparatus 10c detects the input channel thereof connected to the transmission path 12ac as being the first receiving input channel. Hence, the sending signal received through the transmission path 12ac is broadcasted through the transmission paths other than the transmission path 12ac. In addition, the node apparatus 10c supplies an active signal 170c to an output channel thereof having the channel number corresponding to that of the first receiving input channel which is connected to the transmission path 12ac.

The node apparatus 10d receives the sending signal from the transmission paths 12bd and 12cd, but detects the input channel thereof connected to the transmission path 12bd as being the first receiving input channel. Hence, the node apparatus 10d broadcasts only the sending signal received through the transmission path 12bd to other transmission paths such as the transmission paths 12d and 12cd. The sending signal received through the transmission path 12cd is not broadcasted from the node apparatus 10d. In addition, the node apparatus 10d supplies an active signal 170d to an output channel thereof having the channel number corresponding to that of the first receiving input channel which is connected to the transmission path 12bd.

In the node apparatuses 10c and 10d, when the difference between the arrival time of the sending signal received by the first receiving input channel and the arrival time of the sending signal received thereafter by another input channel is shorter than the time it takes for the control of the coupling of the input and output channels to be completed, a signal overlap occurs for an instant. However, this signal overlap occurs within the beginning portion of the preamble of the message packet and is negligible, and for this reason, no problems will be caused thereby. Thus, the sending signal transmitted from the terminal device 14a and broadcasted from the node apparatus 10a is transmitted within the network without any signal overlap that would cause problems. Further, this negligible signal overlap is not accumulated at each node apparatus, since the signal overlap always occurs within the same beginning portion of the preamble of the message packet.

Each of the node apparatuses 10a through 10d supervise all of the input channels thereof within the first supervision time which starts from the detection of the first receiving input channel. In the normal state where no fault exists, the active signal should arrive to the input channels during this first supervision time. When the active signal does not arrive to an input channel, this input channel is discriminated as being a faulty or dormant input channel, and the data on the faulty or dormant input channel is stored in the fault storage part 140. For example, in FIG. 6C, an input channel 174bx of the node apparatus 10b connected to a transmission path 12bx is a faulty of dormant input channel.

Each of the node apparatuses 10a through 10d supervise all of the input channels thereof within the second supervision time which starts after the lapse of the first supervision time. The input channel which receives no input signal during the second supervision time and is not identified as being a faulty or dormant input channel in the fault storage part 140 is discriminated as being an active input channel which receives the active signal in the normal manner. This active input channel is coupled to all of the output channels other than the output channel having a channel number corresponding to that of this active input channel.

In the modification shown in FIG. 5, the coupling of the faulty or dormant input channel to the output channels and the coupling of the input channels to the output channel having the channel number corresponding to that of the faulty or dormant input channel are inhibited until the fault is restored and the stored data in the fault storage part 140 is cleared. But in FIG. 6C, only the faulty or dormant input channel 174bx of the node apparatus 10b connected to the transmission path 12bx is inhibited from being connected to the output channels of the node apparatus 10b.

In a third step, the terminal devices coupled to the node apparatuses 10a through 10d receive the sending signal originating from the terminal device 14a, and each terminal device returns the active signal as the responding signal upon receipt of the sending signal and also collates its own address with the destination address included in the sending signal. In this case, the destination terminal device 14d returns an active signal 172d as shown in FIG. 6B, and since the destination address included in the sending signal coincides with the address of the terminal device 14d, the terminal device 14d transmits a returning signal to the transmission path 12d. As shown in FIG. 6, when the node apparatus 10d receives the returning signal from the transmission path 12d, the node apparatus 10d broadcasts the returning signal through all of the output channels thereof except the output channel having the channel number corresponding to that of the input channel which is connected to the transmission path 12d. As a result, the returning signal is transmitted through the transmission paths 12bd, 12cd and the like. Alternatively, it is possible to output the returning signal received from the transmission path 12d through the output channel having the channel number corresponding to that of the first receiving input channel.

In a fourth step, the node apparatuses 10b, 10c and 10a carry out control similar to the control carried out by the node apparatus 10d. Accordingly, as shown in FIG. 6D, the returning signal is also transmitted within the network. The returning signal is broadcasted within the network simultaneously as the sending signal, because the terminal devices including the terminal device 14d transmit the returning signal immediately after the destination address of the sending signal is discriminated. In FIG. 6D, the transmission path 12cd is an example of the transmission path in which the sending signal and the returning signal overlap.

Therefore, even when terminal devices other than the terminal devices 14a and 14d are connected to the network, these other terminals receive the overlapping sending signal and the returning signal and cannot discriminate the information content due to the interference caused by the overlap. For this reason, the secrecy of the transmission to the other terminal devices which is very important in the communication network is maintained. In addition, in case the sending signal terminates but the returning signal still continues, the other terminals can detect that the network is in use.

Of course, in the transmission path through which the sending signal reaches the destination terminal device 14d, there is no overlap of the sending signal and the returning signal. Hence, the returning signal can reach the sending terminal device 14a from which the sending signal was originated.

In case a fault occurs in the node apparatus 10b shown in FIG. 6E, for example, the node apparatus 10d in the second step does not receive the sending signal from the node apparatus 10b and receives the sending signal only from the node apparatus 10c. Thereafter, the control carried out by the node apparatuses 10a, 10c and 10d are the same as that described before for the second step except that the node apparatus 10b is excluded.

In case the fault occurs in the node apparatus 10b, the returning signal is transmitted to the terminal device 14a in the fourth step through the node apparatus 10c instead of the node apparatus 10b, as shown in FIG. 6F. The fault in the node apparatus 10b is stored in the node apparatus 10a as a faulty or dormant input channel 174ab which is connected to the node apparatus 10b through the transmissiom path 12ab, and the fault in the node apparatus 10b is stored in the node apparatus 10d as a faulty or dormant input channel 174bd which is connected to the node apparatus 10b through the transmission path 12bd. Thereafter, the control carried out by the node apparatuses 10a, 10c and 10d are the same as that described before for the fourth step except that the node apparatus 10b is excluded.

As a general rule, the coupling between two node apparatuses 10 and the coupling between the node apparatus 10 and the terminal device 14 are not distinguished from one another in the first embodiment described heretofore. Accordingly, one node apparatus 10 is not aware of whether another node apparatus 10 or the terminal device 14 is coupled to this one node apparatus 10 through the transmission path 12. For this reason, the terminal device 14 must operate as if it were a node apparatus, so that one node apparatus 10 which is coupled to the terminal device 14 can treat the terminal device 14 in the same manner as another node apparatus 10 coupled to this one node apparatus 10. In other words, the terminal device 14 must be designed to transmit the active signal which may be a single pulse.

However, it is possible to couple to the node apparatus 10 a terminal device which does not have the function of transmitting the active signal. In other words, in the cases shown in FIGS. 3 and 4, the data read out from the fault storage part 140 through the terminals 146 simply need to be neglected by neglecting the display made on the display device in case the display device is provided. On the other hand, in the case shown in FIG. 5, the input channel to which the terminal device not having the function of transmitting the active signal is coupled may be preset by manipulating the corresponding one of the switches $148_0$ through $148_3$.

In the first embodiment, the fundamental restrictions on the sequence of the communication made in the lattice network from the terminal device 14 are as follows. It is more advantageous to carry out the data transmission from the terminal device 14 in the form of message packets, but it is not essential to do so.

Figure 7:
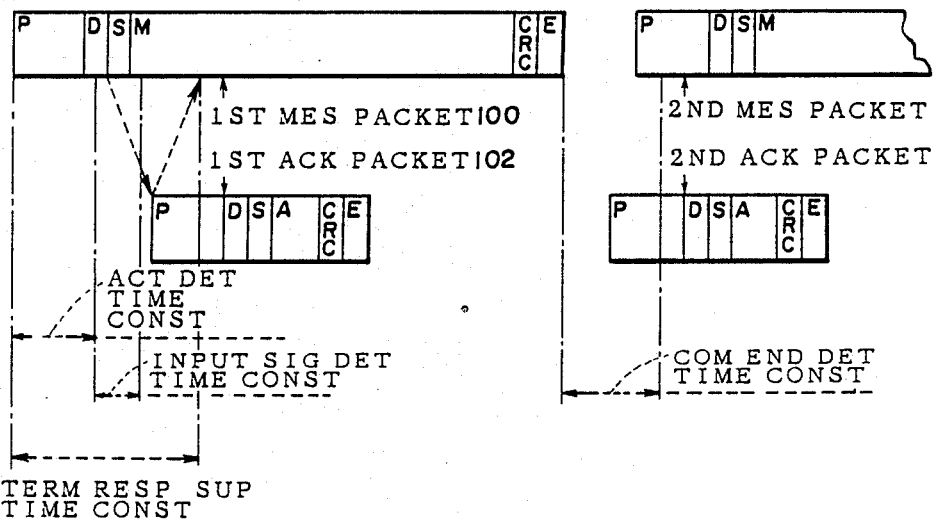
FIG. 7 is a diagram for explaining the flow of the message packets when the returning signal (acknowledge packet) is returned normally in response to the sending signal in the full duplex communication.

FIG. 7 is a diagram for explaining the flow of the message packets when the returning signal (acknowledge packet) is returned normally in response to the sending signal in the full duplex communication. As shown in FIG. 7, a message packet 100 which is transmitted as the sending signal includes a preamble P and a destination address D before a message M. The preamble P continues for at least a predetermined time so as to enable synchronism with the terminal device 14. There are no other restrictions on the message packet 100, but normally, the message packet 100 also includes an origin address S indicating the address of the sending terminal device 14 from which the message packet 100 originates. A check code area CRC for the cyclic redundancy code (CRC) and the like and a packet end code E follow the message M, and it is possible to provide a postamble (not shown) after the packet end code E for the purpose of maintaining the terminal device 14 is synchronism.

The terminal device 14 transmits the active signal immediately when the sending signal, that is, the message packet 100, is first received. When the terminal device 14 discriminates that destination address D of the received message packet 100 coincides with its own address, the terminal device 14 transmits the returning signal immediately after this discrimination is made in the case shown in FIG. 7 for the full duplex communication.

Figure 8:
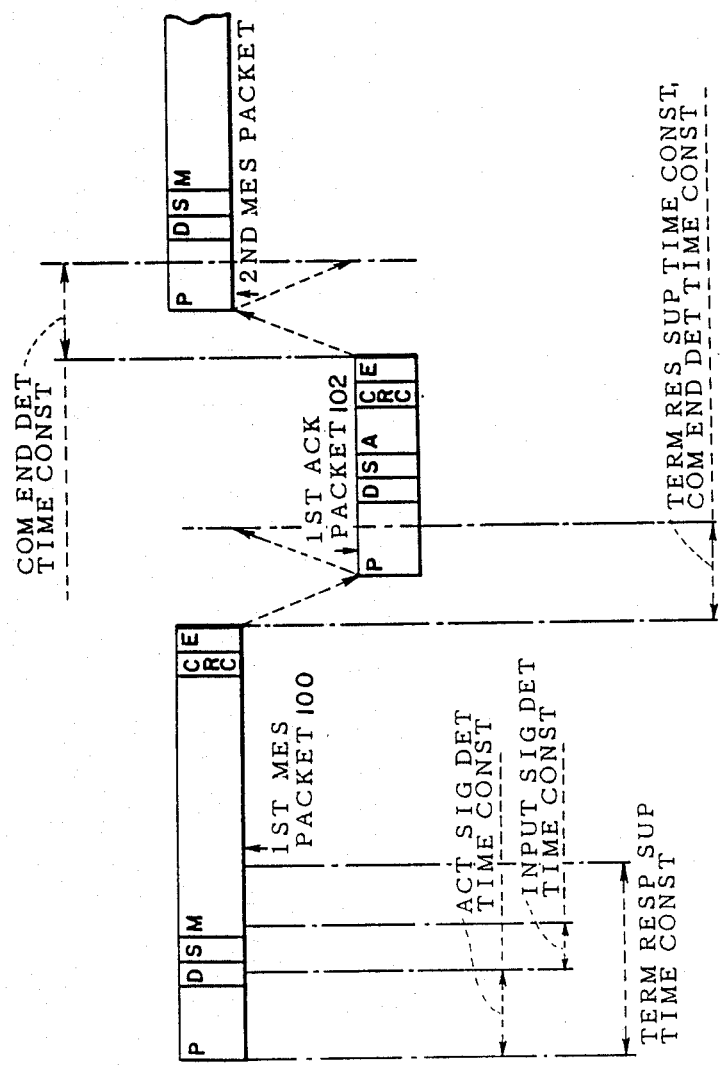
FIG. 8 is a diagram for explaining the flow of the message packets when the returning signal (acknowledge packet) is returned normally in response to the sending signal in the half duplex communication.

FIG. 8 is a diagram for explaining the flow of the message packets when the returning signal (acknowledge packet) is returned normally in response to the sending signal in the half duplex communication. Hence, when the terminal device 14 discriminates that destination address D of the received message packet 100 coincides with its own address, the terminal device 14 transmits the returning signal immediately after the message packet 100 ends in the case shown in FIG. 8 for the half duplex communication.

There are no restrictions on the returning signal, but normally, the returning signal has a format similar to the message packet 100 shown in FIG. 7 or 8. In other words, the returning signal (return message packet) comprises the preamble P, the destination address D, the origin address S of the destination terminal device 14 which received the sending signal (message packet 100), and an acknowledge signal ACK or a not acknowledge signal NACK. The message M may follow the acknowledge signal ACK or the not acknowledge signal NACK. As described before, the transmission of the returning signal to the sending terminal device 14 from which the sending signal originates is preferentially guaranteed.

In the case of the full duplex communication, the terminal device 14 may discontinue the transmission when no input signal is received within the first supervision time from the time when the transmission of the sending signal starts or when an input signal is received within the second supervision time following the first supervision time.

When the terminal device 14 discriminates that it is not the destination of the received sending signal, the terminal device 14 is permitted to transmit another sending signal therefrom immediately after the sending signal ends. The method of detecting the end of the sending signal may be identical to that of the node apparatus 10.

Figure 9:
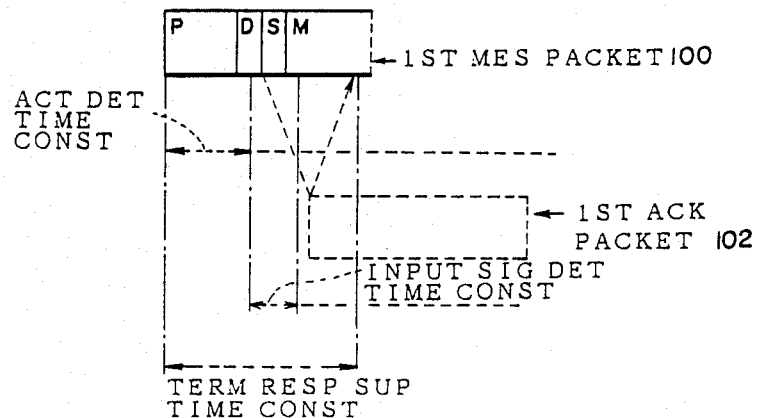
FIG. 9 is a diagram for explaining the flow of the message packets when the returning signal (acknowledge packet) is not returned normally in response to the sending signal in the full duplex communication.

The sending terminal device 14 from which the sending signal originates supervises the receipt of the returning signal from the destination terminal device 14 during a terminal response supervision time (fourth predetermined time) having a predetermined length. When the receipt of the returning signal is detected within the terminal response supervision time, it is discriminated that the destination terminal device 14 can respond normally and that the communication can be continued. On the other hand, when no receipt of the returning signal from the destination terminal device 14 is detected, it is discriminated that the destination terminal device 14 is not able to respond normally and the communication is discontinued as shown in FIG. 9. FIG. 9 is a diagram for explaining the flow of the message packets when the returning signal (acknowledge packet) is not returned normally in response to the sending signal in the full duplex communication. The sending terminal device 14 from which the sending signal originates may re-transmit the sending signal, and the control in this case may be similar to that carried out in the communication employing the CSMA method.

In the case of the full duplex communication, the terminal response supervision time starts from the time when the sending terminal device 14 begins transmission of the sending signal. The length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the returning signal from the time when the sending signal is received. Normally, a slight margin time is added to the length of the terminal response supervision time.

In the case where both the full duplex communication and the half duplex communication are to be enabled, the terminal response supervision time starts from the time when the transmission of the sending signal from the sending terminal device 14 ends. In this case, the length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the returning signal from the time when the receipt of the sending signal ends. The length of this terminal response supervision time is identical to the length of the communication end detection time constant described before. Normally, a slight margin time is also added to the length of this terminal response supervision time.

In the present embodiment, the transmission path 12 is designed for the full duplex communication. Hence, even when a certain terminal device is designed for the half duplex communication, it is possible to shorten the time it takes to determine whether or not the certain terminal device is able to normally receive a signal similarly as in the case of the terminal device designed for the full duplex communication, by adding the following function to a network interface between the certain terminal device and the transmission path 12 of the network. In other words, the network interface is designed to transmit the active signal as a responding signal immediately upon receipt of the sending signal. There are no restrictions on the active signal, and the active signal may take the form of a single pulse, for example. Such an additional function of the certain terminal device is easily realized by making slight modifications to a network control part of the certain terminal device.

When the terminal device 14 transmits another sending signal or a returning signal in succession to the first sending signal, that is, when the terminal device 14 transmits a plurality of message packets in succession, the intervals of the message packets should not exceed the third predetermined time defined by the communication end detection time constant described before. In the case of the full duplex communication, a dummy signal such as the postamble is inserted between two successive message packets (for example, between an Nth message packet and a (N+1)th message packet) so that the third predetermined time will not be exceeded. On the other hand, in the case of the half duplex communication, the destination terminal device 14 transmits an Nth returning signal within the third predetermined time after the receipt of an Nth sending signal ends and preferably immediately after the receipt of the Nth sending signal ends, while the terminal device 14 from which the Nth sending signal originates sends a (N+1)th sending signal within the third predetermined time after the receipt of the Nth returnig signal ends and preferably immediately after the receipt of the Nth returning signal ends.

In summary, according to the first embodiment, the node apparatus 10 carries out two kinds of control so that the sending signal and the returning signal can be transferred simultaneously.

According to a first control, the first receiving input channel is detected, and other input channels which receive a signal are discriminated. These other input channels receive the same sending signal received by the first receiving input channel but through other paths, signals from signal sources other than the signal source of the sending signal, the active signal and the like. This discrimination is carried out during the first supervision time defined by the active detection time constant.

According to a second control, the coupling of the input channels to the output channels of the node apparatus 10 is maintained in the initial state. The sending signal which is received first can be broadcasted without the front portion thereof dropping out, by disconnecting the coupling of the input channels other than the first receiving input channel from the output channels of the node apparatus 10. Hence, besides the sending signal which is received first, the node apparatus 10 can only output the returning signal which is received in succession to the sending signal. In other words, it is possible to simultaneously transfer the sending signal and the returning signal. Accordingly, when the terminal device 14 detects the receipt of the sending signal having its own address as the destination address, the terminal device 14 may transmit the returning signal immediately thereafter, and in this case, it is unnecessary to carry out a control so that the returning signal is transmitted after a predetermined time elapses from the receipt of the sending signal.

Furthermore, according to the present embodiment, it is possible to discriminate the faulty or dormant input channel by detecting the active signal which should be returned from the node apparatus 10 or the terminal device 14 when the sending signal is transmitted. It is possible to take the appropriate measures such as storing the data indicative of the faulty or dormant input channel, display the location of the fault, close the line (channel) containing the fault and the like.

It is therefore possible to realize a single-channel communication in which only one communication can be made from one node apparatus 10 at one time. For this reason, the algorithm of the node apparatus 10 is simplified while maintaining the high data survivability of the lattice communication network in which the link is made according to the first-come-first-output logic by avoiding the faulty node apparatus and the faulty line.

According to the lattice communication network previously proposed in the Japanese Patent Application No. 60-170427 described before, the full duplex communication can only be started after the communication path is fixed, that is, after the sending signal ends and the return signal is transmitted from the destination terminal device. However, according to the present embodiment, it is possible to start the full duplex communication from the time when the transmission of the sending signal starts.

The following advantageous effects are obtainable according to the present embodiment due the complete full duplex communication provided thereby. Firstly, it is possible to simultaneously transfer the sending signal and the returning signal. For this reason, it is possible to detect the completion of the communication by detecting the returning signal, and the control of the retransmission and the continuing of the transmission can be carried out at an early stage. No problems will occur even when the message packet of the first sending signal is long. Thus, the throughput of the system is improved, that is, the data transmission rate of the network employing the node apparatus of the present embodiment is improved.

Secondly, only the destination terminal device can receive the sending signal in the normal manner, and the other terminal devices receive the overlapping sending signal and the returning signal and cannot discriminate the information content due to the interference caused by the overlap. For this reason, the secrecy of the transmission to these other terminal devices is maintained. In addition, in case the sending signal terminates but the returning signal still continues, these other terminals can detect that the network is in use.

Figure 10:
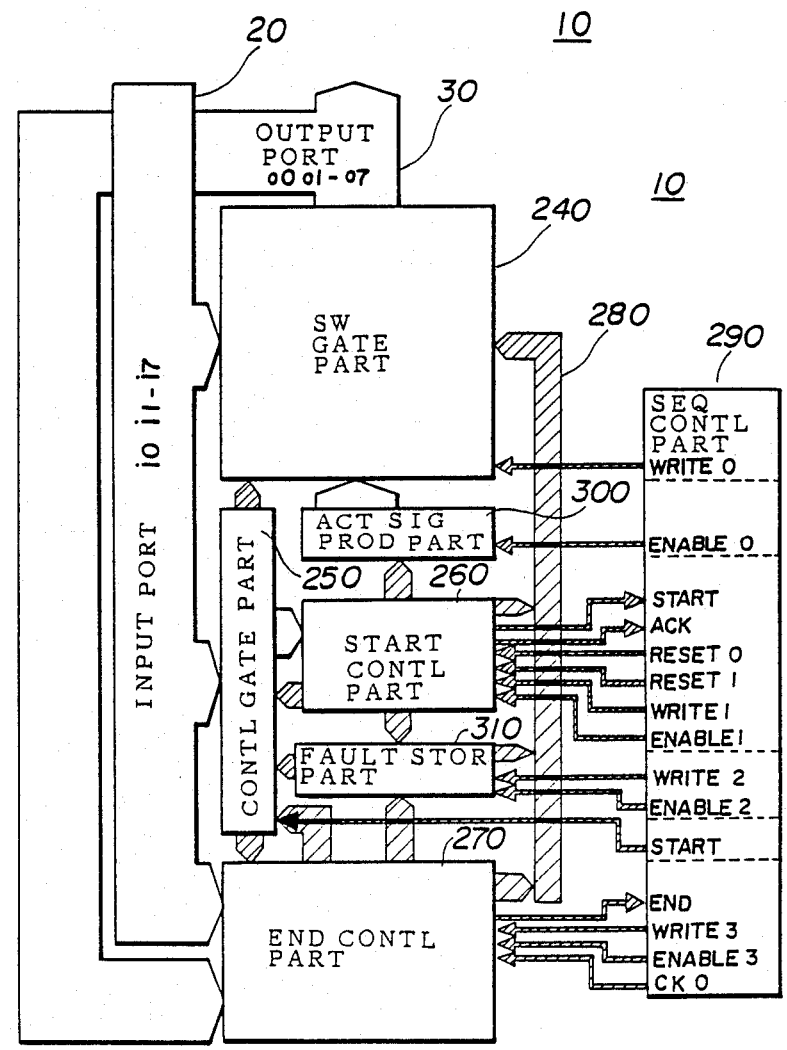
FIG. 10 is a system block diagram showing a second embodiment of the node apparatus according to the present invention.

Next, a description will be given on a second embodiment of the node apparatus according to the present invention, by referring to FIG. 10. In FIG. 10, those parts which are the same as those corresponding parts in FIG. 2 are designated by the same reference numerals, and a description thereof will be omitted. The node apparatus 10 shown in FIG. 10 is also applicable to the lattice communication network shown in FIG. 1. The node apparatus 10 shown in FIG. 10 generally comprises an input port 20, an output port 30, a switching gate part 240, a control gate part 250, a start control part 260, an end control part 270, a gate setting bus 280, a sequence control part 290, an active signal producing part 300 and a fault storage part 310.

The switching gate part 240 selectively couple an arbitrary one of the input channels i0 through i7 to arbitrary ones of the output channels o0 through o7. The input port 20 is coupled to the start control part 260 and the end detecting part 270 through the control gate part 250. The control gate part 250 controls the supply of the signals from the input port 20 to the start control part 260 and the supply of control signals from the start control part 260, the fault storage part 310 and the end control part 270 to the appropriate one of the switching gate part 240, the start control part 260 and the end control part 270.

The start control part 260 detects whether or not the input signal is received by the input port 20 and discriminates the first receiving input channel which receives the input signal first. The end control part 270 detects the end of the input signal received by the input channel connected to the set communication path, and carries out a communication ending process. The switching gate part 240, the start control part 260 and the end control part 270 are mutually coupled to each other through the gate setting bus 280.

The active signal producing part 300 for producing the active signal is coupled to the switching gate part 240 and the start control part 260. The fault storage part 310 for storing the data on the faulty or dormant input channel is coupled to the start control part 260, the end control part 270 and the gate setting bus 280.

The switching gate part 240, the control gate part 250, the start control part 260, the end control part 270, the active signal producing part 300 and the fault storage part 310 are respectively controlled by the sequence control part 290.

Figure 11:
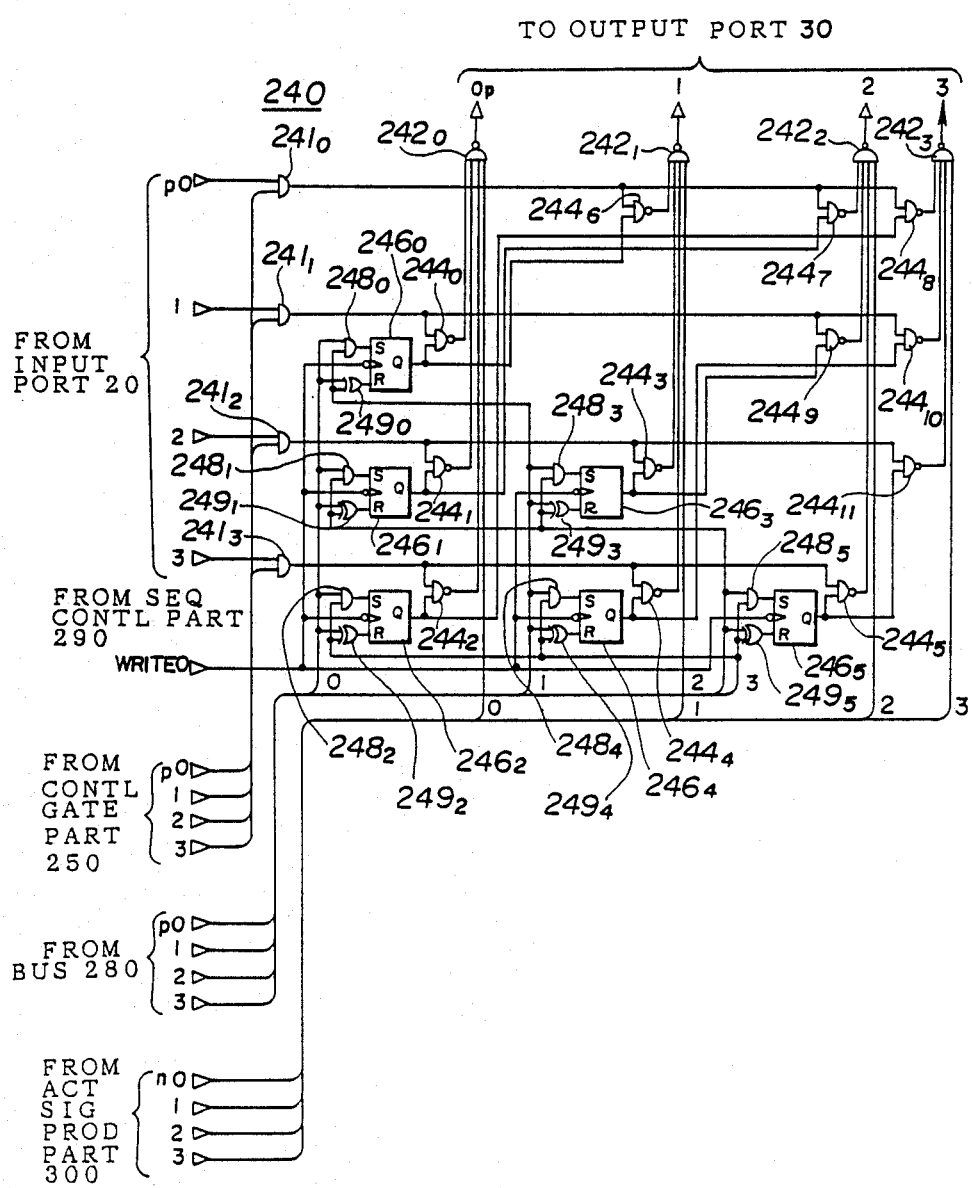
FIG. 11 is a system circuit diagram showing an embodiment of a switching gate part of the node apparatus shown in FIG. 10 for four input and output channels.

FIG. 11 shows an embodiment of the switching gate part 240 for four input and output channels. In FIG. 11 and FIG. 12 through 16 which will be described later, the numbers "0" through "3" indicated beside the terminals denote the channel numbers. The switching gate part 240 comprises four 2-input AND gates $241_0$ through $241_3$, four 4-input NAND gates $242_0$ through $242_3$, twelve $(4 \times (4-1))$ 2-input NAND gates $244_0$ through $244_{11}$, six $(4 \times (4-1)/2)$ SR flip-flops $246_0$ through $246_5$, six $(4 \times (4-1)/2)$ 2-input AND gates $248_0$ through $248_5$, and six $(4 \times (4-1)/2)$ exclusive-OR gates $249_0$ through $249_5$ which are connected as shown.

Each of the AND gates $241_0$ through $241_3$ are connected to a corresponding one of the input channels i0 through i3 and to a corresponding one of outputs of the control gate part 250. An output of each of the AND gates $241_0$ through $241_3$ is connected to all of the NAND gates $242_0$ through $242_3$ except one of the NAND gates $242_0$ through $242_3$ corresponding to the input channel connected to each of the AND gates $241_0$ through $241_3$. An internal circuit of the switching gate part 240 is selectively connected to the input port 20 when a high-level signal is supplied to one of the AND gates $241_0$ through $241_3$ from the control gate part 250.

The following truth table shows the operation of each of the flip-flops $246_0$ through $246_3$. When the input channel and the output channel which are to be coupled are designated and the signal level on the control line of the gate setting bus 280 corresponding to the designated channel becomes high, the switching gate part 240 couples the designated input channel to the output channel responsive to a negative polarity clock pulse signal received from a termianl WRITEO of the sequence control part 290 which will be described later in conjunction with FIG. 17. The designated and non-designated input and output channels are disconneced from each other. The non-designated input channel keeps the previously made connection. Accordingly, a multichannel connection is made to simultaneously permit communication through a plurality of combinations of the coupling between the input and output channels of one node apparatus 10.

TABLE

|  | Gate Setting Bus 280 |  | S | R | Q |
|---|---|---|---|---|---|
| Write | H | H | H | L | H |
| Erase | H | L | L | H | L |
|  | L | H | L | H | L |
| Stable | L | L | L | L | $Q_0$ |

Accordingly, the states of the of the NAND gates $244_0$ through $244_{11}$ can be set in one control. In addition, the number of the flip-flops $246_0$ through $246_5$ for holding the states of the NAND gates $244_0$ through $244_{11}$ can be kept down to a minimum.

Figure 12:
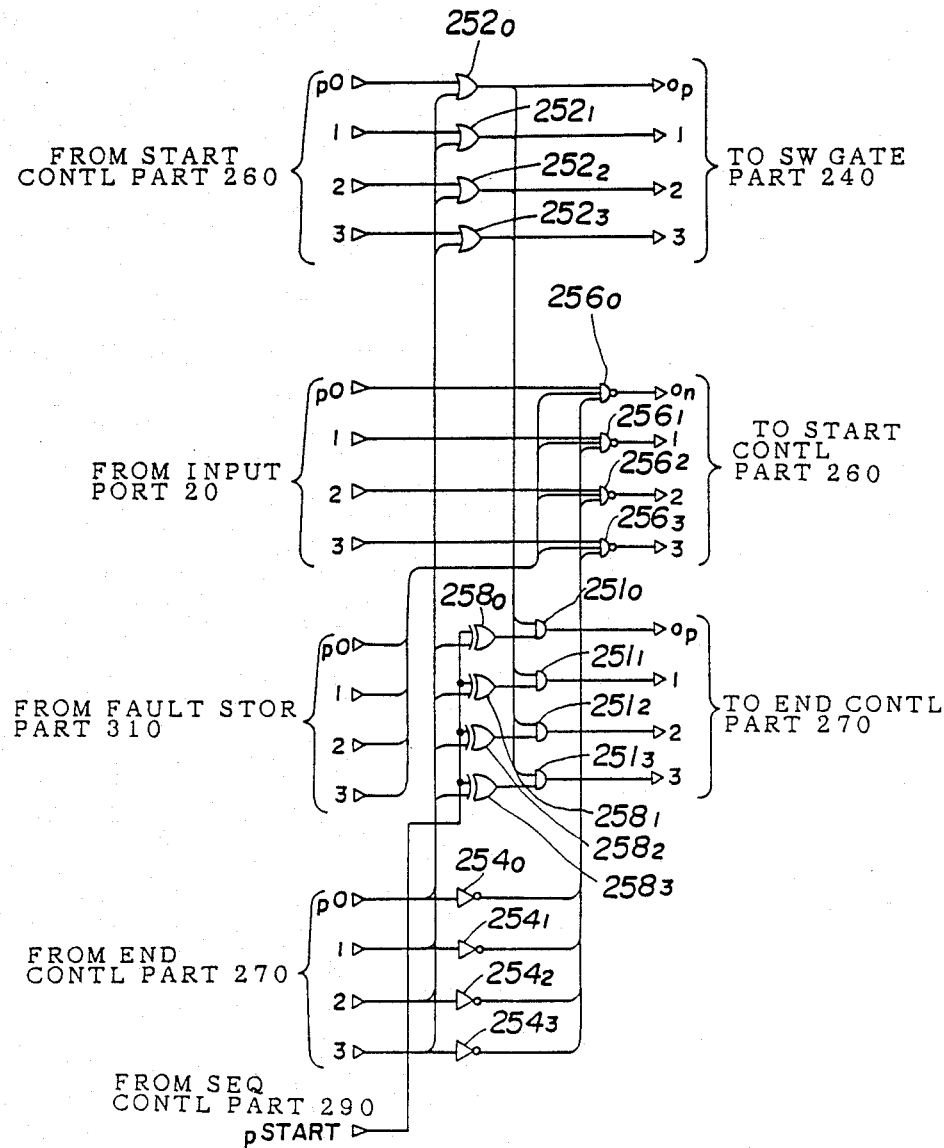
FIG. 12 is a system circuit diagram showing an embodiment of a control gate part of the node apparatus shown in FIG. 10 for four input and output channels.
Figure 17:
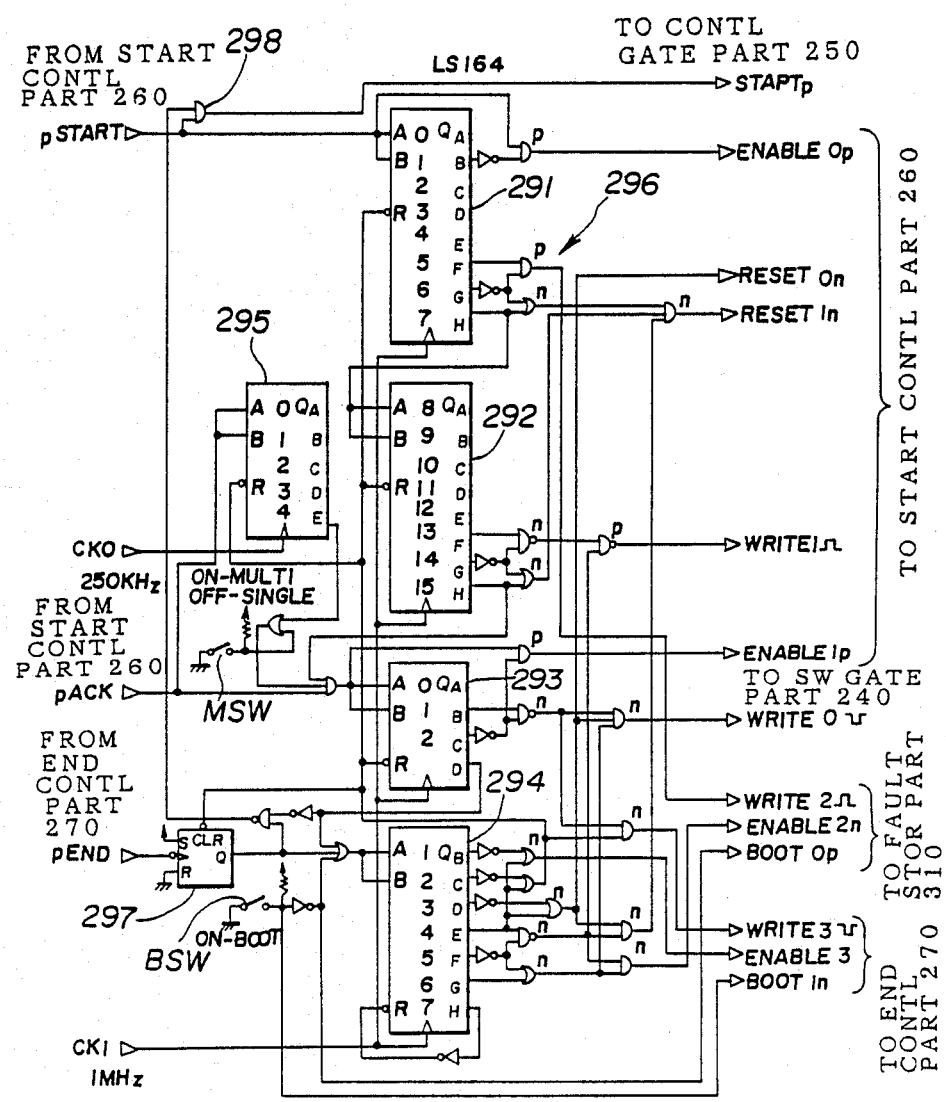
FIG. 17 is a system circuit diagram showing an embodiment of a sequence control part of the node apparatus shown in FIG. 10 for four input and output channels.

FIG. 12 shows an embodiment of the control gate part 250 for four input and output channels. The control gate part 250 comprises four 2-input AND gates $251_0$ through $251_3$, four 2-input OR gates $252_0$ through $252_3$, four inverters $254_0$ through $254_3$, four 3-input NAND gates $256_0$ through $256_3$, and four exclusive-OR gates $258_0$ through $258_3$ which are connected as shown. Each of the OR gates $252_0$ through $252_3$ obtain a logical sum of signals from a corresponding channel of the start control part 260 and the end control part 270, and supply the logical sum to a corresponding one of the NAND gates $241_0$ through $241_3$ within the switching gate part 240. Corresponding ones of the inverters $254_0$ through $254_3$ and the NAND gates $256_0$ through $256_3$ obtain a logical product of signals from a corresponding channel of the input port 20 and the fault storage part 310, and supply the logical product to the start control part 260. A signal from a terminal START of the sequence control part 290 shown in FIG. 17 is supplied to each of the exclusive-OR gates $258_0$ through $258_3$. Corresponding ones of the exclusive-OR gates $258_0$ through $258_3$ and the AND gates $251_0$ through $251_3$ selectively supply to the end control part 270 a signal from a corresponding channel of the end control part 270 when detecting the end of the communication in the fixed communication path and supply to the end control part 270 a signal from a corresponding channel of the start control part 260 when detecting an interruption in the sending signal which is received by the first receiving input channel.

The active signal producing part 300 produces an active signal indicating that the node apparatus 10 is operating normally and is active. As descibed before, the active signal has no restrictions except for the signal length thereof. The signal length of the active signal is set to a value which is longer than a minimum time required to operate flip-flops of the start control part 260 and terminates within the length of the active detection time constant.

Figure 13:
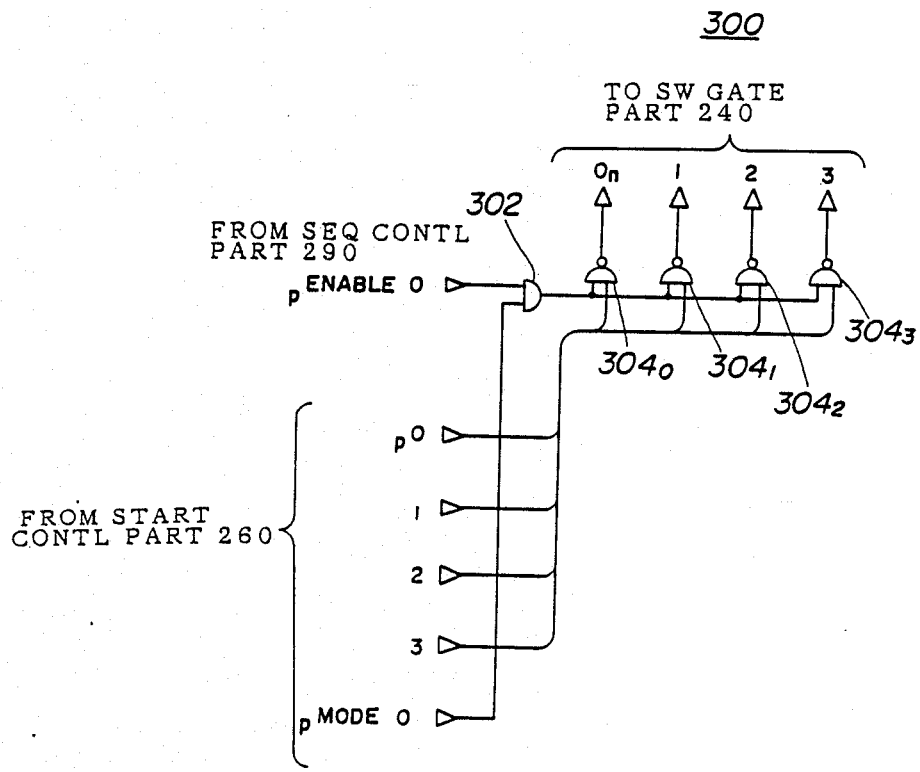
FIG. 13 is a system circuit diagram showing an embodiment of an active signal producing part of the node apparatus shown in FIG. 10 for four input and output channels.

FIG. 13 shows an embodiment of the active signal producing part 300 for four input and output channels. The active signal producing part 300 comprises a 2-input AND gate 302 and four 2-input NAND gates $304_0$ through $304_3$. The AND gate 302 obtains a logical product of a signal from a terminal ENABLE0 of the sequence control part 290 shown in FIG. 17 and a signal from a terminal MODE0 of the start control part 260 shown in FIG. 14. The logical product obtained from the AND gate 302 is supplied to each of the NAND gates $304_0$ through $304_3$. Each of the NAND gates $304_0$ through $304_3$ obtain an inverted logical product of the output signal of the AND gate 302 and a signal from a corresponding channel of the start control part 260, and supply the inverted logical product to a corresponding channel of the switching gate part 240. In the present embodiment, the signal from the terminal MODE0 of the start control part 260 is constantly set to a high level by an output of a mode changing switch 267.

Figure 14:
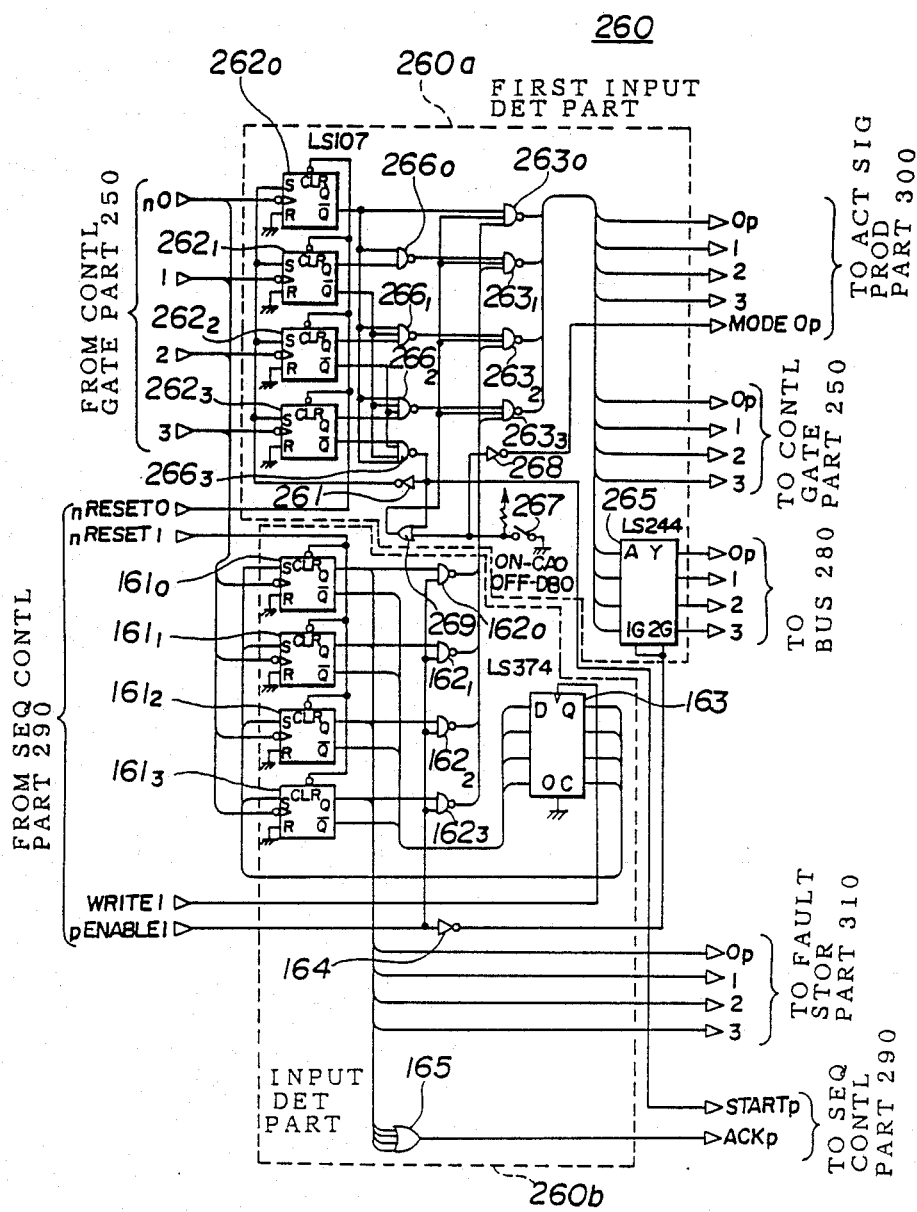
FIG. 14 is a system circuit diagram showing an embodiment of a start control part of the node apparatus shown in FIG. 10 for four input and output channels.

FIG. 14 shows an embodiment of the start control part 260 for four input and output channels. The start control part 260 generally comprises a first input signal detecting part 260a and an input signal detecting part 260b. The first input signal detecting part 260a detects the input signals from the input channels i0 through i3 and discriminates which input signal is received first, that is, which input channel receives the input signal first, according to the first-come-first-output logic. The first input signal detecting part 260a comprises inverters 261 and 268, four SR flip-flops $262_0$ through $262_3$, four 3-input NAND gates $263_0$ through $263_3$, a bus buffer 265, four NAND gates $266_0$ through $266_3$, the mode changing switch 267 and an OR gate 269 which are connected as shown. The input signals from the input channels i0 through i3 are obtained through the control gate part 250 and are supplied to clock terminals of the flip-flops $262_0$ through $262_3$.

A signal from a terminal RESET0 of the sequence control part 290 is supplied to CLR-terminals (clear terminals) of the flip-flops $262_0$ through $262_3$. The flip-flops $262_0$ through $262_3$ constitute a circuit for holding the states of the input signals from the input channels. The 2-input NANd gate $266_0$, the 3-input NAND gate $266_1$ and the 4-input NAND gate $266_2$ constitute a circuit for assigning priorities to output signals of the flip-flops $262_0$ through $262_3$. The 4-input NAND gate $266_3$ and the inverter 261 consitute a circuit for holding the states of the flip-flops $262_0$ through $262_3$ by supplying a low-level signal to S-terminals (set terminals) of all of the flip-flops $262_0$ through $262_3$ responsive to the input signal supplied to one of the flip-flops $262_0$ through $262_3$. The circuit constituted by the 4-input NAND gate $266_3$ and the inverter 261 also has the function of reporting to the sequence control part 290 that the sending signal is received.

The mode changing switch 267 is used to change the mode of the transmission between a control after output (CAO) mode and a detect before output (DBO) mode, and the mode changing switch 267 is constantly closed in the present embodiment to select the CAO mode. The OR circuit 269 obtains a logical sum of an output signal of the mode changing switch 267 and the output signal of the NAND gate $266_3$, and supplies the logical sum to each of the NAND gates $263_0$ through $263_3$. The output signal of the NAND gate $266_3$ is also supplied to a terminal START of the sequence control part 290 shown in FIG. 17. The NAND gates $263_0$ through $263_3$ are also supplied with signals of corresponding channels of the input signal directing part 260b, Furthermore, the NAND gates $263_0$ through $263_3$ are respectively supplied with the $\overline{Q}$-output of the flip-flop $262_0$ and the outputs of the NAND gates $266_0$ through $266_2$. The outputs of the NAND gates $263_0$ through $263_3$ are supplied to the active signal producing part 300 and the control gate part 250, and also to the gate setting bus 280 through the bus buffer 265.

The input signal detecting part 260b detects whether or not an input signal is received by the input port 20. The input signal detecting part 260b comprises four SR flip-flops $161_0$ through $161_3$, four 2-input NAND gates $162_0$ through $163_3$, a flip-flop 163, an inverter 164 and a 4-input OR gate 165 which are connected as shown. The input signals from the input channels i0 through i3 are obtained through the control gate part 250 and are supplied to clock terminals of the flip-flops $161_0$ through $161_3$.

A signal from a terminal RESET1 of the sequence control part 290 shown in FIG. 17 is supplied to CLR-terminals (clear terminals) of the flip-flops $161_0$ through $161_3$. The flip-flops $161_0$ through $161_3$ constitute a circuit for holding the states of the input signals from the input channels. The flip-flop 163 stores the output states of the flip-flops $161_0$ through $161_3$, and supplies a low-level signal to the S-terminals (set terminals) of the flip-flops $161_0$ through $161_3$ to fix the states thereof. The NAND gates $162_0$ through $162_3$ constitute a gate circuit for controlling the connection of the outputs of the flip-flops $161_0$ through $161_3$ to the first input detecting part 260a. Each of the NAND gates $162_0$ through $162_3$ receive a signal from a terminal ENABLE1 of the sequence control part 290 shown in FIG. 17 and the Q-output of the corresponding one of the flip-flops $161_0$ through $161_3$. This signal from the terminal ENABLE1 is inverted in the inverter 164 and supplied to the bus buffer 265 of the first input signal detecting part 260a. The OR gate 165 obtains a logical sum of the Q-outputs of the flip-flops $161_0$ through $161_3$, and supplies to a terminal ACK of the sequence control part 290 the logical sum indicative of whether or not the sending signal is received. The Q-outputs of the flip-flops $161_0$ through $161_3$ are also supplied to the fault storage part 310. A signal from a terminal WRITE1 of the sequence control part 290 shown in FIG. 17 supplied to a clock terminal of the flip-flop 163.

Figure 15:
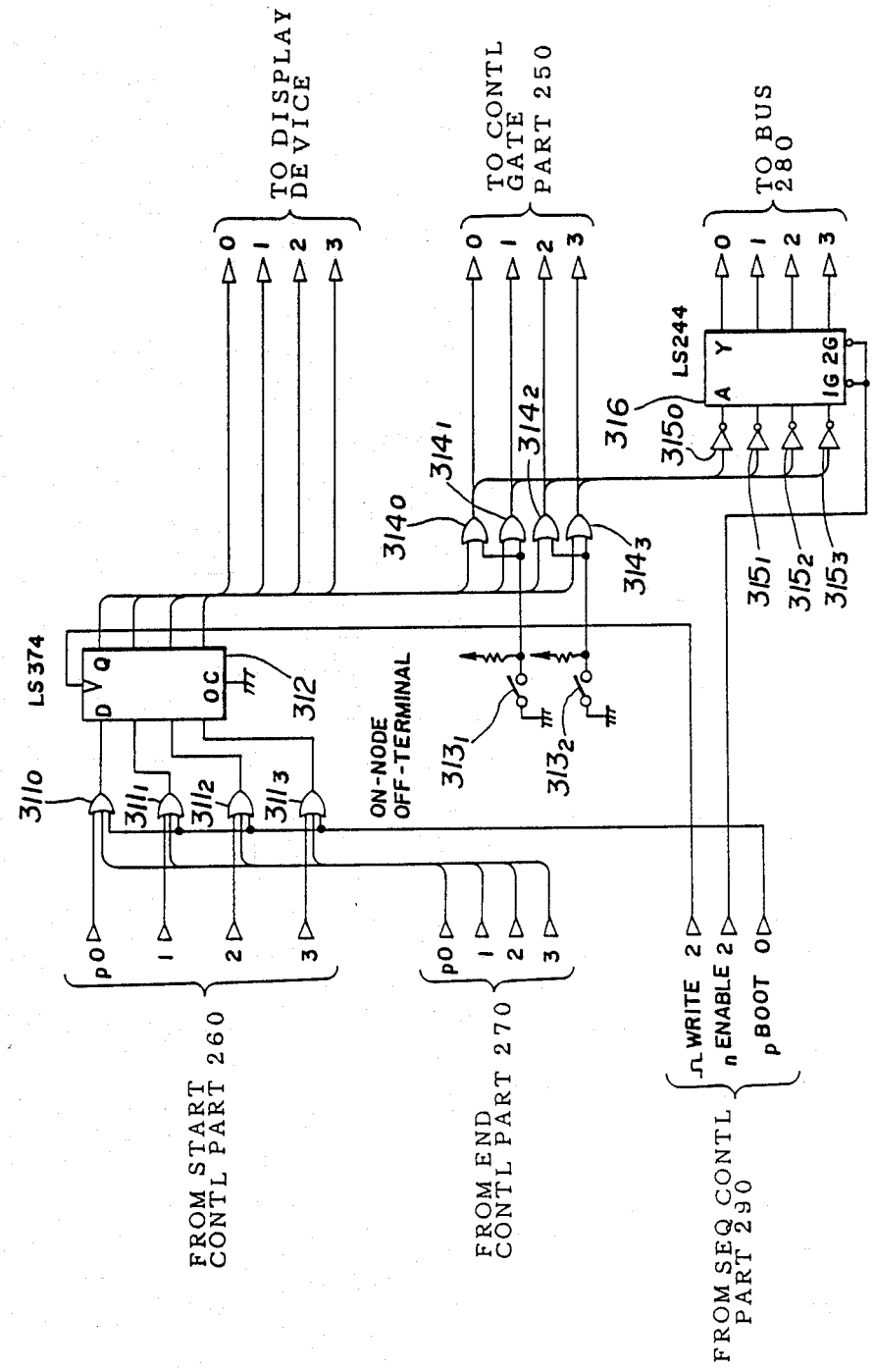
FIG. 15 is a system circuit diagram showing an embodiment of a fault storage part of the node apparatus shown in FIG. 10 for four input and output channels.

FIG. 15 shows an embodiment of the fault storage part 310 for four input and output channels. The fault storage part 310 comprises four 3-input OR gates $311_0$ through $311_3$, a flip-flop 312, mode changing switches $313_1$ and $313_2$, four 2-input OR gates $314_0$ through $314_3$, four inverters $315_0$ through $315_3$, and a bus buffer 316 which are connected as shown. Each of the OR gates $311_0$ through $311_3$ receive signals of a corresponding channel from the start control part 260 and the end control part 270 and a signal from a terminal BOOT0 of the sequence control part 290 shown in FIG. 17. The outputs of the OR gates $311_0$ through $311_3$ are supplied to the flip-flop 312 which stores the data on the faulty or dormant input channels. A signal from a terminal WRITE2 of the sequence control part 290 shown in FIG. 17 is supplied to a clock terminal of the flip-flop 312. The mode changing switches $313_1$ and $313_2$ are opened for each corresponding pair of channels connected to a terminal device which does not have the function of producing the active signal. The data stored in the flip-flop 312 of the fault storage part 310 and indicating the faulty or dormant input channels may be read out arbitrarily and displayed on a display device (not shown) for monitoring the location of the fault. The outputs of the OR gates $314_0$ through $314_3$ are supplied to the control gate part 250, and the outputs of the bus buffer 316 are connected to the gate setting bus 280. A signal from a terminal BOOT0 of the sequence control part 290 shown in FIG. 17 is supplied to the bus buffer 316.

Figure 16:
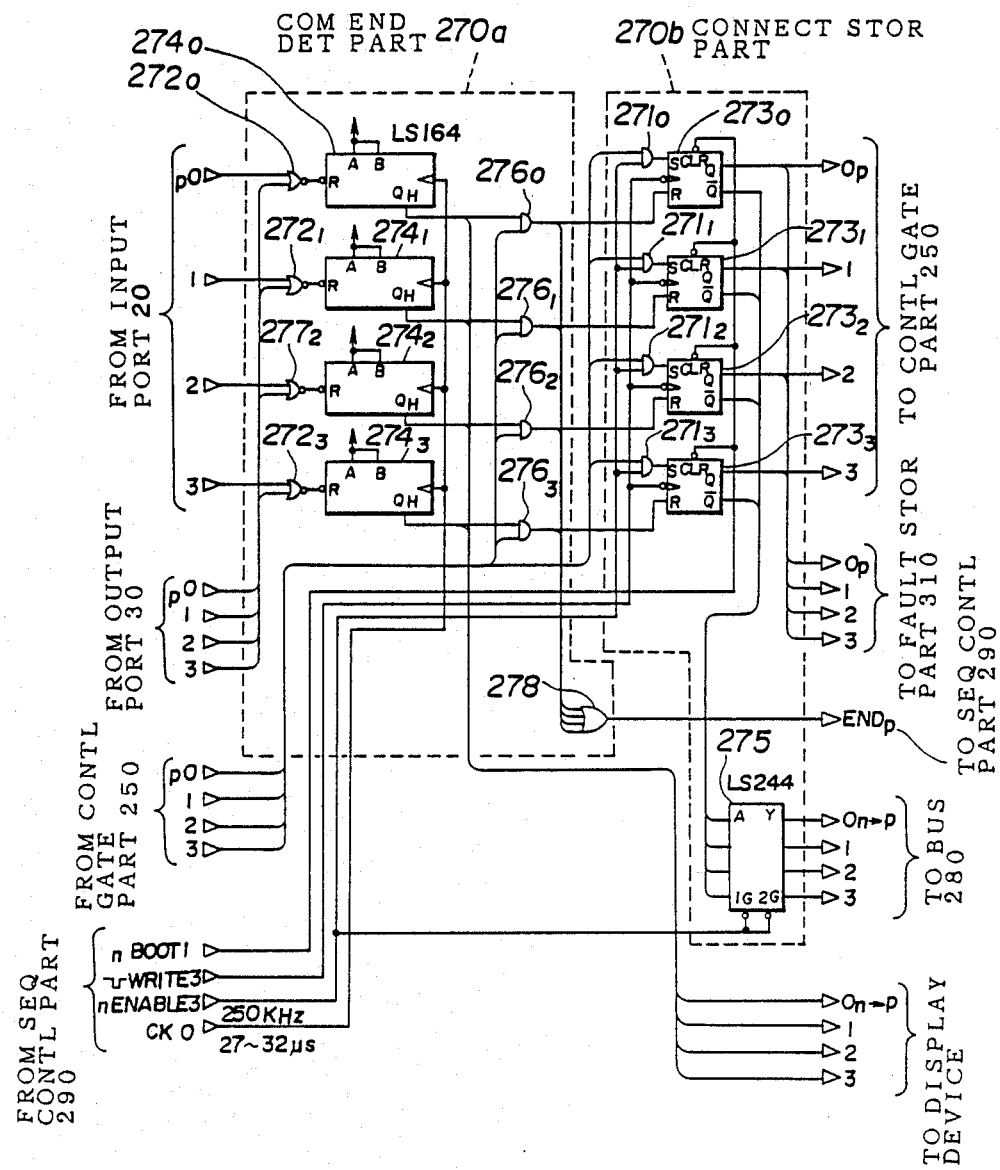
FIG. 16 is a system circuit diagram showing an embodiment of an end control part of the node apparatus shown in FIG. 10 for four input and output channels.

FIG. 16 shows an embodiment of the end control part 270 for four input and output channels. The end control part 270 generally comprises a communication end detecting part 270a and a connection storage part 270b. The communication end detecting part 270a comprises four 2-input NOR gates $272_0$ through $272_3$, four shift registers $274_0$ through $274_3$, four 2-input AND gates $276_0$ through $276_3$, and a 4-input OR gate 278 which are connected as shown.

Each of the NOR gates $272_0$ through $272_3$ receive signals of a corresponding channel from the input port 20 and output port 30. The outputs of the NOR gates $272_0$ through $272_3$ are supplied to R-terminals (reset terminals) of the corresponding shift registers $274_0$ through $274_3$. The shift registers $274_0$ through $274_3$ detect the end of the communication based on the communication end detection time constant as will be described later. A system clock signal from a terminal CK0 is supplied to clock terminals of the shift registers $274_0$ through $274_3$. Each of the AND gates $276_0$ through $276_3$ receive a signal of a corresponding channel from the control gate part 250 and the $Q_H$-output of the corresponding one of the shift registers $274_0$ through $274_3$. The OR gate 278 obtains a logical sum of the outputs of the AND gates $276_0$ through $276_3$ and reports to the sequence control part 290 through a terminal END that the communication is ended in the fixed communication path or that the sending signal received by the first receiving input channel is interrupted. The control gate part 250 controls the AND gates $276_0$ through $276_3$ to determine whether the OR gate 278 is to report the end of the communication or the interruption of the sending signal. As may be readily understood from FIG. 16, the end control part 270 discriminates that the communication is ended when signals no longer exist in both the two input channels included in the fixed communication path which is used for the communication.

The communication end detection time constant (third predetermined time) is provided to detect that no signal continues after the sending signal (or returning signal) and the communication is ended. As described before in the description of the first embodiment, the length of the communication end detection time constant is set to a time which is required to discriminate the true end of the communication from consecutive "0"s or "1"s in the case of the full duplex communication, and normally, a slight margin time is added to the length of the communication end detection time constant. In other words, the length of the communication end detection time constant is one bit in the case of the Manchester encoding, and is seven or more bits in the case of the encoding in which "0" is inserted into six consecutive "1"s in NRZI, for example. Normally, the length of the communication end detection time constant is made two times longer to add the slight margin time, that is, to two bits or fourteen or more bits.

When enabling both the full duplex communication and the half duplex communication, the length of the communication end detection time constant to see to a time which is essentially equal to a sum of a propagation delay time for a return trip covering the maximum tolerable distance between the node apparatus 10 and another node apparatus 10 or the terminal device 14 and a time it takes for the terminal device 14 to send a returning (or sending) signal after receipt of a sending (or returning) signal. Normally, a slight margin time is added to this length of the communication end detection time constant.

The connection storage part 270b comprises four 2-input AND gates $271_0$ through $271_3$, four SR flip-flops $273_0$ through $273_3$, and a bus buffer 275 which are connected as shown in FIG. 16. Each of the AND gates $271_0$ through $271_3$ receive a signal from a terminal ENABLE3 of the sequence control part 290 shown in FIG. 17 and a signal of the corresponding channel from the control gate part 250. The outputs of the AND gates $271_0$ through $271_3$ are supplied to S-terminals of the corresponding flip-flops $273_0$ through $273_3$, and the outputs of the AND gates $276_0$ through $276_3$ within the communication end detecting part 270a are supplied to R-terminals of the corresponding flip-flops $273_0$ through $273_3$. In addition, a signal from a terminal WRITE3 of the sequence control part 90 shown in FIG. 17 is supplied to clock terminals of the flip flops $273_0$ through $273_3$. The Q-outputs of the flip-flops $273_0$ through $273_3$ are supplied to the control gate part 250 and the fault storage part 310, while the $\bar{Q}$-outputs of the flip-flops $273_0$ through $273_3$ are supplied to the bus buffer 275.

The flip-flops $273_0$ through $273_3$ store data indicative of the channels in the communication path which is fixed, and the AND gates $271_0$ through $271_3$ control the write-in and erasure of the data in the flip-flops $273_0$ through $273_3$.

Accordingly, in the end control part 270 shown in FIG. 16, the shift registers $274_0$ through $274_3$ can constantly detect the end of the communication in all of the channels. In other words, it is possible to detect the end of the communication in a channel which is not selected by the control gate part 250. For this reason, there is no delay corresponding to the communication end detection time constant when detecting the end of the communication immediately after the selected channel is changed.

The communication end detection time constant simply needs to be set appropriately for the case where the full duplex communication is chosen and the case where both the full duplex communication and the half duplex communication are to be enabled. Accordingly, there is no need to modify the hardware of the end control part 270 itself.

In FIG. 16, it is possible to use four 2-input NAND gates in place of the NOR gates $272_0$ through $273_3$. In this case, the end control part 270 discriminates that the communication is ended when a signal no longer exist in one of the two input channels included in the fixed communication path which is used for the communication.

FIG. 17 shows an embodiment of the sequence control part 290 for four input and output channels. The sequence control part 290 comprises five shift registers 291 through 295, gate group 296 comprising gates for producing necessary control signals from outputs of the shift registers 291 through 295, a flip-flop 297, a 2-input AND gate 298, a mode changing switch MSW, and a boot switch BSW which are connected as shown.

When there is a contention between the start of the communication and the end of the communication, the flip-flop 297 and the AND gate 298 assign the priority to the end of the communication. A system clock signal from a terminal CK0 is supplied to a clock terminal of the shift register 295, while a system clock signal from a terminal CK1 is supplied to clock terminals of the shift registers 291 through 294. In the present embodiment, the shift register 295 is not used, and further, the mode changing switch MSW is constantly open. The boot switch BSW is manipulated only when initially starting the node apparatus 10, and is used to initially set all of the flip-flops within the node apparatus 10. The active detection time constant and the input signal detection time constant are determined in the sequence control part 290. There is no need to modify the hardware of the sequence control part 290 itself between the case where the full duplex communication is chosen and the case where both the full duplex communication and the half duplex communication are to be enabled.

Figure 18:
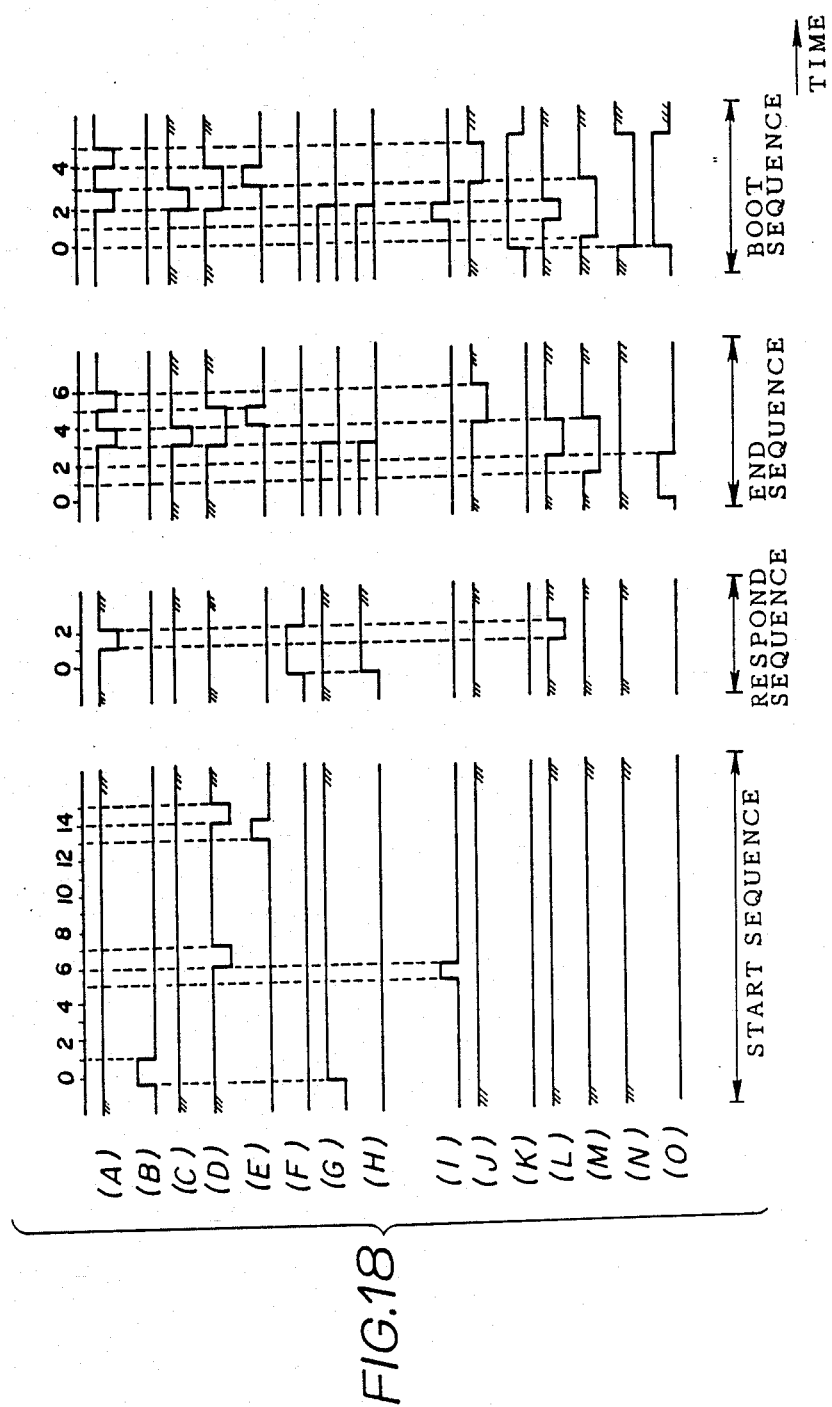
FIGS. 18(A) through 18(O) are timing charts for explaining the operation of the sequence control part shown in FIG. 17.

FIGS. 18(A) through 18(O) are timing charts for explaining the operation of the sequence control part 290 shown in FIG. 17. FIG. 18(A) shows the signal supplied to the switching gate part 240 from the terminal WRITE0, and FIG. 18(B) shows the signal supplied to the active signal producing part 300 from the terminal ENABLE0. FIGS. 18(C) through 18(F) respectively show the signals supplied to the start control part 260 from the terminals RESET0, RESET1, WRITE1 and ENABLE1, and FIGS. 18(G) and 18(H) respectively show the signals supplied to terminals START and ACK of the sequence control part 290 from the start control part 260. FIGS. 18(I) through 18(K) respectively show the signals supplied to the fault storage part 310 from the terminals WRITE2, ENABLE2 and BOOT0. FIGS. 18(L) through 18(N) respectively show the signals supplied to the end control part 270 from the terminals WRITE3, ENABLE3 and BOOT1, and FIG. 18(O) shows the signal supplied to a terminal END of the sequence control part 290 from the end control part 270. FIGS. 18(A) through 18(O) show the signal timings with reference to the start sequence, respond sequence, end sequence and the boot sequence of the sequence control part 290, and the numbers above the waveform denote the number of clock pulses. In the start sequence, the sequence control part 290 detects the first input signal when a communication starts, and broadcasts the detected first input signal. In the respond sequence, the sequence control part 290 detects the responding signal and fixes the communication path. In the end sequence, the sequence control part 290 stores the change in the state of the fixed communication path into the switching gate part 240 so as to fix the conditions on the communication path. Further, in the boot sequence, the sequence control part 290 initializes setting of the node apparatus 10.

In the initial state where no communication is made between the input and output channels of the node apparatus 10, the gates of the switching gate part 240 are open and signals can pass through the node apparatus 10 because the input port 20 and the output port 30 are coupled through the switching gate part 240. In this initial state, each input channel is coupled to all of the output channels except the output channel having a channel number corresponding thereto.

In the initial state, when the input signal is supplied to one of the input channels i0 through i7 (i0 through i3 in FIG. 10), the first input signal detecting part 260a detects which one of the input channels i0 through i3 receives the input signal first according to the first-come-first-output logic. As a result, only the first receiving input channel is coupled to those output channels other than the output channel having a channel number corresponding to that of the first receiving input channel. In other words, a broadcast communication is made by transferring the input signal which is received by the first receiving input channel of the input port 20 to all of the output channels of the output port 30 except for the output channel having the channel number corresponding to that of the first receiving input channel.

When the first input signal detecting part 260a detects the receiving input channel, the sequence control part 290 is activated, and the sequence control part 290 starts a time supervision of the active detection time constant.

The active detection time constant (first predetermined time) is provided to receive active signals from input channels other than the first receiving input channel. Accordingly, even when the input signal from the same source as the input signal received by the first receiving input channel is received by another input channel or when another input signal from another source is received by another input channel, the input signals received by the input channels other than the first receiving input channel can be received.

The length of the active detection time constant is set to a time which is essentially equal to a sum of a propagation delay time for a return trip covering a maximum tolerable distance between the node apparatus 10 and another node apparatus 10 or the terminal device 14 and the duration of the active signal. Normally, a slight margin time is added to the length of the active detection time constant. The input signal identical to that received by the first receiving input channel but obtained through a roundabout route and received by an input channel other than the first receiving input channel, the input signals from other sources are received by the input channels other than the first receiving input channel and the active signal is received from the active signal producing part 300, all within the length of the active detection time constant.

The input channels which receive the input signals within a first supervision time defined by the active detection time constant are stored in the flip-flops $161_0$ through $161_3$ of the input signal detecting part 260b. When the first supervision time ends, the clock signal from the terminal WRITE2 of the sequence control part 90 is supplied to the clock terminal of the flip-flop 312 within the fault storage part 310. As a result, out of the input channels i0 through i3, one or more input channels which receive no input signal during the first supervision time are stored into the flip-flop 312 as being faulty or dormant input channels.

Next, the sequence control part 290 carries out the time supervision of the input signal detection time constant. The input signal detection time constant (second predetermined time) is provided to detect whether or not there is an input signal after the first supervision time defined by the active detection time constant. For example, the length of the input signal detection time constant is one bit in the case of the Manchester encoding, and is seven or more bits in the case of the encoding in which "0" is inserted into six consecutive "1"s in NRZI. Normally, a slight margin time is added to the one or seven bits to make it two times longer, and the length of the input signal detection time constant is set to two bits or fourteen or more bits. A second supervision time defined by the input signal detection time constant is provided to detect the input channels which receive the input signal identical to that received by the first receiving input channel but obtained through a roundabout route, the input signals from sources other than the source of the input signal received by the first receiving input channel and the active signal, while distinguishing the input signals from the active signal.

One or more input channels which receive input signals within the second supervision time are stored in the flip-flops $161_0$ through $161_3$ of the input signal detecting part $260b$. When the second supervision time ends, the input channel which receives no input singal within the second supervision time but thereafter receives an input signal is coupled to the output channel having the channel number corresponding to that of the first receiving input channel.

When a third supervision time defined by the communication end detection time constant elapses, the end control part 270 instructs the sequence control part 290 to reset the first input signal detecting part $260a$ and the input signal detecting part $260b$ of the start control part 260 to the initial state, by supplying a signal to the clock terminal of the flip-flop 297 of the sequence control part 290 through the terminal END.

The end of the communication may be detected from the input signal received by the first receiving input channel, so that a restore process is carried out when the input signal is no longer received by the first receiving input channel. Alternatively, it is possible to carry out the restore process when the input signal is no longer received by either one of the first receiving input channel or the output channels coupled to the first receiving input channel. It is possible to detect that an input signal is no longer obtained at a channel when the logic value of the input signal remains the same (for example, "0") for a predetermined time.

According to the present embodiment, the data on an input channel which receives a signal during the first supervision time but receives no signal during the second supervision time is stored in the input signal detecting part $260b$ even after the second supervision time, and only the input signal such an input channel can be detected. It is possible to thereafter couple such an input channel to the output channel having the channel number corresponding to that of the first receiving input channel, and disconnect all of the other remaining input channels from the output channels. When a certain input channel which receives a signal during the first supervision time but receives no signal during the second supervision time thereafter receives a returning signal, the certain input channel is coupled to the output channel having the channel number corresponding to that of the first receiving input channel and the first receiving input channel is coupled to the output channel having a channel number corresponding to that of the certain input channel, so as to fix the coupling between the input and output channels of the node apparatus 10. All of the input channels other than the certain input channel and the first receiving input channel are connected to the output channels other than the output channels having the channel numbers corresponding to those of the certain input channel and the first receving input channel.

Next, a descritpion will be given on the sequence of the communication made in a lattice communication network using four node apparatuses 10 of the second embodiment described heretofore, by referring to FIGS. 19A through 19G. For convenience' sake, four node apparatuses 10A through 10D are coupled in the lattice form through transmission paths 12A, 12AB, 12AC, 12BD, 12CD and 12D each having four channels in FIGS. 19A through 19G. A terminal device 14A is coupled to the node apparatus 10A, and a terminal device 14D is coupled to the node apparatus 10D. In FIGS. 19A through 19G, a dot-pattern is provided on the transmitting side of each node apparatus or terminal device, a bold arrow indicates the flow of the sending signal, and an arrow with hatchings indicates the flow of the responding signal and the returning signal.

When carrying out the full duplex communication according to the present embodiment, the detection of the input signal and the control of the coupling between the input and output channels based on this detection are carried out in the following seven basic steps.

Firstly, the lattice network is in the initial state, and in a first step shown in FIG. 19A, the terminal device 14A, for example, transmits a sending signal in the form of the message packet. The sending signal includes a destination address indicative of the intended destination of the sending signal, and the intended destination is the terminal device 14D in this case. The sending signal is supplied to the node apparatus 10A through the transmission path 12A. In the initial state, each input channel of the node apparatus 10A is coupled to all of the output channels thereof except the output channel having a channel number corresponding thereto.

When the node apparatus 10A detects that the sending signal from the terminal device 14A is received first, the node apparatus 10A transfers the sending signal to all of the output channels thereof except the output channel having the channel number corresponding to that of the first receiving input channel connected to the transmission path 12A. In other words, the sending signal is broadcasted from the node apparatus 10A from the output channels connected to the transmission paths 12AB, 12AC and the like. In addition, the node apparatus 10A disconnects from the output channels thereof the input channels which are other than the first receiving input chanel and are not in the fixed transmission path, and an active signal 230a is produced from the active signal producing part 300 and is supplied to the output channel of the node apparatus 10A having the channel number corresponding to that of the first receiving input channel which is connected to the transmission path 12A.

Figure 19B:
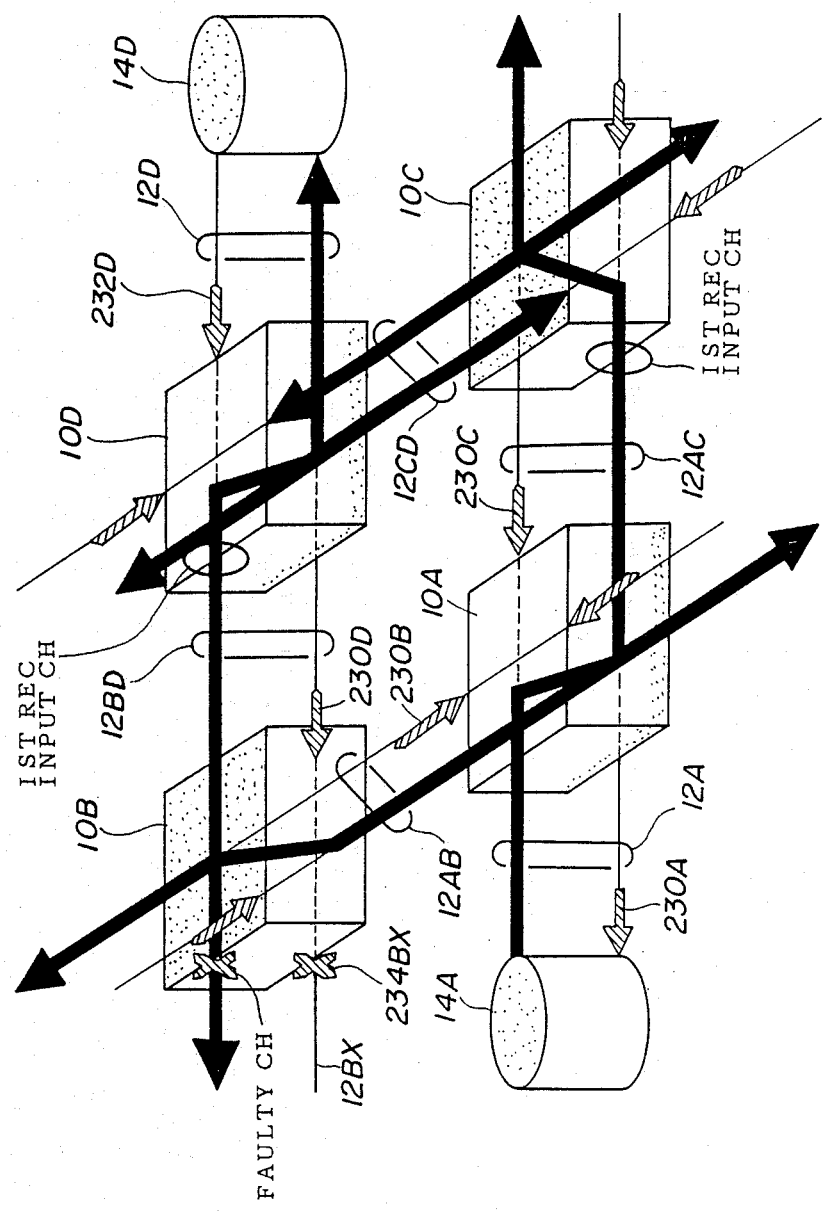

Next, in a second step shown in FIG. 19B, the node apparatus 10B receives the sending signal through the transmission path 12AB, the node apparatus 10C receives the sending signal through the transmission path 12AC, and the node apparatus 10D receives the sending signal through the transmission paths 12BD and 12CD. The node apparatuses 10B, 10C and 10D broadcast the sending signal similarly as in the case of the node apparatus 10A. In this case, the node apparatus 10C detects the input channel thereof connected to the transmission path 12AC as being the first receiving input channel. Hence, the sending signal received through the transmission path 12AC is broadcasted through the transmission paths other than the transmission path 12AC, that is, through the transmission path 12CD and the like. In addition, the node apparatus 10C supplies an active signal 230C to an output channel thereof having a channel number corresponding to that of the first receiving input channel which is connected to the transmission path 12AC.

The node apparatus 10D receives the sending signal from the transmission paths 12BD and 12CD, but detects the input channel thereof connected to the transmission path 12BD as being the first receiving input channel. Hence, the node apparatus 10D broadcasts only the sending signal received through the transmission path 12BD to other transmission paths such as the transmission paths 12D and 12CD. The sending signal received through the transmission path 12CD is not broadcasted from the node apparatus 10D. In addition, the node apparatus 10D supplies an active signal 230D to an output channel thereof having a channel number corresponding to that of the first receiving input channel which is connected to the transmission path 12BD.

In the node apparatuses 10C and 10D, when the difference between the arrival time of the sending signal received by the first receiving input channel and the arrival time of the sending signal received thereafter by another input channel is shorter than the time it takes for the control of the coupling of the input and output channels to be completed, a signal overlap occurs for an instant. However, this signal overlap occurs within the beginning portion of the preamble of the message packet and is negligible, and for this reason, no problems will be caused thereby. Thus, the sending signal transmitted from the terminal device 14A and broadcasted from the node apparatus 10A is transmitted within the network without any signal overlap that would cause problems. Further, this negligible signal overlap is not accumulated at each node apparatus, since the signal overlap always occurs within the same beginning portion of the preamble of the message packet.

Each of the node apparatuses 10A through 10D supervise all of the input channels thereof within the first supervision time which starts from the detection of the first receiving input channel, so as to detect the input channel which receives no signal during the first supervision time. The data on the channel which receives no signal during the first supervision time is stored in the input signal detecting part 260b. In the normal state where no fault exists in the node apparatus and the node apparatuses and the terminal devices coupled thereto, the active signal should arrive to the input channels during this first supervision time. When the active signal does not arrive to an input channel, this input channel is discriminated as being a faulty or dormant input channel, and the data on the faulty or dormant input channel is stored in the fault storage part 310. For example, in FIG. 19B, an input channel 234BX of the node apparatus 10B connected to a transmission path 12BX is a faulty or dormant input channel.

Each of the node apparatuses 10A through 10D supervise all of the input channels thereof within the second supervision time which starts after the lapse of the first supervision time. At this time, the active signal is already ended. The input channel which receives no input signal during the second supervision time may be coupled to all of the output channels other than the output channel having a channel number corresponding to that of this input channel. The input channel which receives no input signal during the second supervision time and is not identified as being a faulty or dormant input channel in the fault storage part 310 may be coupled to all of the output channels other than the output channel having a channel number corresponding to that of this input channel.

In a third step, the terminal devices coupled to the node apparatuses 10A through 10D receive the sending signal originating from the sending terminal device 14A, and each terminal device returns the active signal as the responding signal upon receipt of the sending signal and also collates its own address with the destination address included in the sending signal. In this case, the terminal device 14D returns an active signal 232D as shown in FIG. 19B, and since the destination address included in the sending signal coincides with the address of the terminal device 14D, the terminal device 14D transmits a returning signal to the transmission path 12D. When the node apparatus 10D receives the returning signal from the transmission path 12D as shown in FIG. 19C, the node apparatus 10D detects out of the input channels having channel numbers corresponding to those of the output channels from which the sending signal was transmitted the input channel which receives no signal during the second supervision time but receives a signal after the end of the second supervision time. This detected input channel is coupled to the output channel having the channel number corresponding to that of the first receiving input channel.

In the case shown in FIG. 19C, when the node apparatus 10D receives the returning signal from the transmission path 12D after a predetermined time elapses from the second supervision time, the node apparatus 10D connects the input channel which receives the returning signal to the output channel which has a channel number corresponding to that of the transmission path 12BD. Accordingly, the returning signal from the transmission path 12D is outputted from the node apparatus 10D through the transmission path 12BD.

Then, after the terminal response supervision time in the case of the full duplex communication and after the third predetermined time defined by the communication end detection time constant in the case where both the full duplex communication and the half duplex communication are to be enabled, the node apparatus 10D couples all of the remaining input channels to all of the output channels other than the output channel having the channel number corresponding to that of the input channel which received the returning signal. As a result, it is possible to prevent the node apparatus 10D from detecting the sending signal from the transmission path 12CD shown in FIG. 19D. In other words, in this case, the transmission paths 12BD and 12D become coupled to each other.

In a fourth step, the node apparatuses 10B and 10A carry out control similar to that carried out by the node apparatus 10D. Hence, as shown in FIG. 19D, the returning signal reaches the terminal device 14A through the communication path which was used to transfer the sending signal. The sending signal has a predetermined length, and the terminal devices such as the terminal device 14D transmit the returning signal immediately after the destination address of the sending signal is discriminated. Accordingly, the sending signal and the returning signal are transmitted simultaneously. For this reason, even when terminal devices other than the terminal devices 14A and 14D are connected to the network, these other terminals receive the overlapping sending signal and the returning signal and cannot discriminate the information content due to the interference caused by the overlap. Therefore, the secrecy of the transmission to the other terminal devices which is very important in the communication network is maintained. In addition, it is possible to carry out the multichannel communication.

In a fifth step shown in FIG. 19E, when the node apparatus 10C detects that the returning signal is not received through the transmission path 12CD and the like and the sending signal is no longer received through the transmission path 12AC, the node apparatus 10C couples each of the input channels to all of the output channels other than the output channel having a channel number corresponding thereto. In other words, when the node apparatus 10C detects that no input signal is received during the second supervision time, that the returning signal is not received even after the second supervision time and that the sending signal is no longer received, the node apparatus 10C couples each of the input channels to all of the output channels other than the output channel having a channel number corresponding thereto. This means that the communication path is fixed by way of paths excluding the node apparatus 10C or that the communication is not completed and the terminal device 14A has discontinued to send the sending signal. Accordingly, in all other cases, the arrival of the returning signal within the terminal response supervision time starting from the detection of the first receiving input channel is guaranteed. When the sending signal does not reach the terminal device 14D for some reason and the terminal device 14A discontinues the transmission of the sending signal because the returning signal is not received, the node apparatus 10C couples each of the input channels to all of the output channels other than the output channel having a channel number corresponding thereto.

In the case where both the full duplex communication and the half duplex communication are to be enabled, when the node apparatus 10C detects that the sending signal is no longer received through the transmission path 12AC and the returning signal is not received through the transmission path 12CD and the like even after the time defined by the communication end detection time constant elapses, the node apparatus 10C couples each of the input channels to all of the output channels other than the output channel having a channel number corresponding thereto. In other words, when the node apparatus 10C detects that there are input channels which do not receive the sending signal and do not receive the returning signal during the terminal response supervision time which starts from the end of the sending signal, the node apparatus 10C couples each of these input channels to all of the output channels other than the output channel having the channel number corresponding thereto.

By controlling the coupling of the input and output channels in each of the node apparatuses 10 (10C in this case) not included in the communication path of the sending signal and the returning signal, it is possible to set and fix the communication path between the termminal device 14A and the terminal device 14D. Each of the node apparatuses 10 may carry out the control to set and fix a communication path through the paths which are unused by the communication path which is already fixed and in use.

In a sixth step, when a different sending signal is received by the node apparatus 10D from a first terminal device 14 (not shown) in FIG. 19F, this different sending signal is transferred within the network through an unused communication path other than the communication path which is fixed and already in use, similarly to the case described before where the sending signal is sent from the terminal device 14A.

A second terminal device 14 (not shown) having the destination address of the different sending signal returns a different returning signal upon receipt of the different sending signal. In a seventh step shown in FIG. 10G, this different returning signal is sent to the first terminal device 14 from which the different sending signal originates, through the same communication path used for the different sending signal, similarly to the case described before where the returning signal is sent from the terminal device 14D. As a result, a new communication path is set and fixed between the first and second terminal devices 14.

Therefore, each node apparatus 10 detects the existence or non-existence of the input signal and carries out sequential control during the times defined by the active detection time constant, the imput signal detection time constant, the terminal response supervision time and the communication end detection time constant. For example, in the case where the sending terminal device 14 from which the first sending signal originates is authorized to continue and end the full duplex communication, that is, normally when the interval of the sending signal is shorter than the time it takes to detect the end of the signal and the returning signal is transmitted intermittently, the node apparatus 10 detects that a signal is no longer received by the pair of input channels in the fixed communication path or detects that a signal is no longer received by either one of the pair of input channels in the fixed communication path. In this case, the node apparatus 10 couples all of the input channels to all of the output channels other than the output channels having channel numbers corresponding to those of the pair of input channels in the fixed communication path. In this state, the returning signal is not transmitted.

In the case of the half duplex communication and in the case of the full duplex communication where no priority needs to be set for the transmitting station and the receiving station, the node apparatus 10 detects that a signal is no longer received by neither channels of the pair of input channels in the fixed communication path, and couples all of the input channels to all of the output channels other than the output channels having channel numbers corresponding to those of the pair of input channels in the fixed communication path.

Instead of detecting the end of the communication by detecting that a signal is no longer received by neither channels of the pair of input channels, it is possible to detect the end of the communication by detecting that a signal is no longer obtained at either the input channel or an output channel having a channel number corresponding to that of this input channel, with respect to the pair of input channels. This is because, when a signal is no longer obtained at one channel of the pair of input channels, a signal is of course no longer obtained at the output channel having a channel number corresponding to that of the other channel of the pair of input channels.

Instead of detecting the end of the communication by detecting that a signal is no longer received by neither channels of the pair of input channels, it is possible to detect the end of the communication by detecting that a signal is no longer obtained at one channel of the pair of input channels nor at an output channel having a channel number corresponding to that of the one channel of the pair of input channels. This is because, when a signal is no longer obtained at neither channels of the pair of input channels, a signal is of course no longer obtained at neither channels of the pair of output channels having channel numbers corresponding to those of the pair of input channels.

As a general rule, the coupling between two node apparatuses 10 and the coupling between the node apparatus 10 and the terminal device 14 are not distinguished from one another in the second embodiment described heretofore. Accordingly, one node apparatus 10 is not aware of whether another node apparatus 10 or the terminal device 14 is coupled to this one node apparatus 10 through the transmission path 12. For this reason, the terminal device 14 must operate as if it were a node apparatus, so that one node apparatus 10 which is coupled to the terminal device 14 can treat the terminal device 14 in the same manner as another node apparatus 10 coupled to this one node apparatus 10. In other words, the terminal device 14 must be designed to transmit the active signal which may be a single pulse.

However, it is possible to couple to the node apparatus 10 a terminal device which does not have the function of transmitting the active signal. In other words, the data read out from the fault storage part 310 simply need to be neglected by neglecting the display made on the display device in case the display device is provided. On the other hand, the pair of input channels to which the terminal device not having the function of transmitting the active signal is coupled may be preset by manipulating the corresponding one of the switches $313_1$ and $313_2$.

In the second embodiment, the fundamental restrictions on the sequence of the communication made in the lattice network from the terminal device 14 are the same as those described before for the first embodiment. It is more advantageous to carry out the data transmission from the terminal device 14 in message packets, but it is not essential to do so.

The sending terminal device 14 from which the sending signal originates supervises the receipt of the returning signal from the destination terminal device 14 during the terminal response supervision time (fourth predetermined time) having a predetermined length. When the receipt of the returning signal is detected within the terminal response supervision time, it is discriminated that the destination terminal device 14 can respond normally and that the communicattion can be continued.

The sending terminal device 14 from which the sending signal originates discontinues the transmission of the sending signal when no input signal is received within the first supervision time from the time when the transmission of the sending signal starts, or when an input signal is received within the second supervision time. In the former case, there is a fault in either the transmission path 12 or the node apparatus 10 connected to the terminal device 14, and a restoring process must be carried out. On the other hand, in the latter case, a collision is generated between the terminal device 14 and the node apparatus 10 connected thereto, and the terminal device 14 must re-transmit the sending signal.

On the other hand, when no receipt of the returning signal from the destination terminal device 14 is detected, it is discriminated that the sending signal did not reach the destination terminal device 14 or the destination terminal device 14 was not able to respond normally, and the communication is discontinued as shown in FIG.9 described before. The sending terminal device 14 from which the sending signal originates may re-transmit the sending signal, and the control in this case may be similar to that carried out in the communication employing the CSMA method.

As described before, in the case of the full duplex communication, the terminal response supervision time starts from the time when the terminal device 14 begins transmission of the sending signal. The length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the returning signal from the time when the sending signal is received. Normally, a slight margin time is added to the length of the terminal response supervision time.

Further, in the case where both the full duplex communication and the half duplex communication are to be enabled, the terminal response supervision time starts from the time when the transmission of the sending signal from the terminal device 14 ends as described before. In this case, the length of the terminal response supervision time is set essentially equal to a sum of the propagation delay time for a return trip covering a maximum tolerable distance between the node apparatus 10 and anotyer node apparatus 10 or the terminal device 14 and the time it takes for the destination terminal device 14 to begin transmission of the returning signal from the time when the receipt of the sending signal ends. The length of this terminal response supervision time is identical to the length of the communication end detection time constant described before. Normally, a slight margin time is also added to the length of this terminal response supervision time. It is thus guaranteed that the input signal will reach the node apparatus 10 within the terminal response supervision time.

The destination terminal device 14 may be designed to report the receipt of the sending signal after the sending signal is correctly received. In other words, the returning signal may be transmitted immediately after the receipt of the sending signal is ends. This method of transmitting the returning signal applies to both the acknowledge signal ACK and the not acknowledge signal NACK.

In the present embodiment, the transmission path 12 is also designed for the full duplex communication as in the case of the first embodiment. Hence, even when a certain terminal device is designed for the half duplex communication, it is possible to shorten the time it takes to determine whether or not the certain terminal device is able to normally receive a signal similarly as in the case of the terminal device designed for the full duplex communication, by adding the following function to a network interface between the certain terminal device and the transmission path 12 of the network. In other words, the network interface is designed to read the destination address of the received sending signal (message packet), to discriminate whether or not the destination address coincides with the address of the certain terminal device, and to transmit the active signal as a responding signal immediately when it is discriminated that the destination address coincides with the address of the certain terminal device. The active signal corresponds to the returning signal and is transferred preferentially in each of the node apparatuses 10. There are no restrictions on the active signal, and the active signal may take the form of a single pulse, for example. Such an additional function of the certain terminal device is easily realized by making slight modifications to a network control part of the certain terminal device.

When the terminal device 14 transmits a second sending or returning signal in succession to the first sending or returning signal, that is, when the terminal device 14 transmits a plurality of message packets in succession, the intervals of the message packets should not exceed the third predetermined time defined by the communication end detection time constant described before. In other words, when the fixed communication path is used to continue the communication, one message packet should be transmitted before the third predetermined time elapses from the end of another message packet which is presently being transmitted.

In the case of the full duplex communication, for example, a dummy signal such as the postamble is inserted between two successive message packets (for example, between an Nth message packet and a (N+1)th message packet) so that the third predetermined time will not be exceeded. On the other hand, in the case of the half duplex communication, the destination terminal device 14 transmits an Nth returning signal within the third predetermined time after the receipt of an Nth sending signal ends and preferably immediately after the receipt of the Nth sending signal ends, while the terminal 14 from which the Nth sending signal originates sends a (N+1)th sending signal within the third predetermined time after the receipt of the Nth returning signal ends and preferably immediately after the receipt of the Nth returning signal ends. Similarly, even when the data is transmitted in a form other than message packets such as when transmitting audio or video information, the length of the no-signal-state should not exceed the third predetermined time.

The communication can be ended by simply stopping the transmission of the signal from the terminal device 14.

According to the present embodiment, the degree of freedom with respect to the following points is high provided that the detection of the input signal and the control of the coupling of the input and output channels based on this detection are carried out in the seven basic steps described before.

Firstly, there is not limit to the maximum and minimum lengths of the message packet, and it is not essential that the data take the form of the message packet.

Secondly, there is no limit to the number of times the sending signal and the returning signal may be repeated, and the fixed communication path may be used exclusively therefor.

Thirdly, it is possible to freely determine the data transmission rate at the terminal device which transmits the sending signal provided that the data transmission rate is less than the maximum data transmission rate determined by the hardware constituting the communication network.

Fourthly, it is possible to freely select either one of the full duplex communication and the half duplex communication, and it is also possible to enable both the full duplex communication and the half duplex communication within the communication network.

In summary, according to the second embodiment, the node apparatus 10 carries out two kinds of control so that the sending signal and the returning signal can be transferred simultaneously.

According to a first control, the first receiving input channel is detected, and other input channels which receive signals are discriminated. These other input channels receive the same sending signal received by the first receiving input channel but through other paths, and signals from signal sources other than the signal source of the sending signal. This discrimination is carried out during the first supervision time defined by the active detection time constant.

According to a second control, detection is carried out to detect whether or not an input signal is received by input channels other than the input channels which were discriminated as receiving input signals during the first control so as to exclude from the detection the input channels which were discriminated as receiving input signals during the first control. Alternatively, the input channels which were discriminated as receiving input signals during the first control are disconnected from the output channels, so that besides the sending signal which is received first, the node apparatus can only output the returning signal which is received in succession to the sending signal.

Accordingly, it is possible to simultaneously transfer the sending signal and the returning signal. When the destination terminal device detects the sending signal intended thereto, the destination terminal device may transmit the returning signal immediately. This means that it is unnecessary to carry out a control so that the returning signal is transmitted after a predetermined time elapses from the receipt of the sending signal.

In addition, the coupling of the input channels to the output channels of the node apparatus is maintained in the initial state. The sending signal which is received first can be broadcasted without the front portion thereof dropping out, by disconnecting the coupling of the input channels other than the first receiving input channel to the output channels of the node apparatus.

Furthermore, according to the present embodiment, it is possible to discriminate the faulty or dormant input channel by detecting the active signal which should be returned from the node apparatus or the terminal device when the sending signal is transmitted. It is possible to take the appropriate measures such as storing the data indicative of the faulty or dormant input channel, display the location of the fault, close the line (channel) containing the fault and the like.

It is therefore possible to realize a multi-channel communication in which a plurality of communications can be made from one node apparatus at one time. It is possible to maintain the high data survivability of the lattice communication network in which the link is made according to the first-come-first-output logic by avoiding the faulty node apparatus and the faulty line.

According to the lattice communication network prevously proposed in the Japanese Patent Application No. 60-170427 described before, the full duplex communication can only be started after the communication path is fixed, that is, after the sending signal ends and the return signal is transmitted from the destination terminal device. However, according to the present embodiment, it is possible to start the full duplex communication from the time when the transmission of the sending signal starts.

The following advantageous effects are obtainable according to the present embodiment due the complete full duplex communication provided thereby. Firstly, it is possible to simultaneously transfer the sending signal and the returning signal. For this reason, it is possible to detect the completion of the communication by detecting the returning signal, and the control of the retransmission and the continuing of the transmission can be carried out at an early stage.

Secondly, only the destination terminal device can receive the sending signal in the normal manner, and the other terminal devices receive the overlapping sending signal and the returning signal and cannot discriminate the information content due to the interference caused by the overlap. For this reason, the secrecy of the transmission to these other terminal devices is maintained.

Thirdly, it is possible to carry out the half duplex communication by use of the same node apparatus, that is, the same algorithm may be used for the full duplex communication and the half duplex communication. Moreover, the combined use of the full duplex communication and the half duplex communication is permitted.

Fourthly, the communication sequence which must be followed by the terminal device is simple, and network interface may be made compact and produced at a low cost. Therefore, it is possible to realize by use of the node apparatus a communication system which is highly feasible and is especially suited for carrying out the full duplex communication.

Further, the present invention is not limited to these embodiments, but various variations and modifications may be made without departing from the scope of the present invention.

What is claimed is:

1. A node apparatus for a communication network having a multi-junction architecture, said communication network having a plurality of transmission paths each coupling one node apparatus to another node apparatus or a terminal device, said node apparatus comprising:

an input port comprising a plurality of input channels connected to the transmission paths;

an output port comprising a plurality of output channels connected to the transmission paths;

a switching gate part for coupling said input and output channels of said input and output ports; and control means for controlling said switching gate part to selectively couple said input and output channels, said control means comprising first input detecting means coupled to said input port for detecting a first receiving input channel which receives a signal first out of said input channels, first time-out means for timing a second predetermined time after a first predetermined time elapses from the detection of said first receiving input channel in said first input detecting means, and input signal detecting means coupled to said first time-out means for detecting whether or not said input channels receive a signal from the transmission paths, said control means controlling said switching gate part to maintain said input and output channels coupled to each other in an initial state when said input signal detecting means detects that no signal is received at said input channels so that each input channel is coupled to all of said output channels other than an output channel having a corresponding channel number, said control means controlling said switching gate part responsive to the detection of said first receiving input channel in said first input detecting means so that all of said input channels other than said first receiving input channel are disconnected from said output channels, thereby transferring the signal received by said first receiving input channel to all of said output channels other than an output channel having a channel number corresponding to that of said first receiving input channel, said input signal detecting means supervising whether or not a signal is received by arbitrary input channels having channel numbers corresponding to those of the output channels which transfer the signal received by said first receiving input channel and detecting a specific one of said arbitrary input channels which receives no signal during said second predetermined time, said control means controlling said switching gate part responsive to the detection of said specific input channel in said input signal detecting means so that said specific input channel is coupled to said output channels including the output having the channel number corresponding to that of said first receiving input channel.

2. A node apparatus as claimed in claim 1 in which said control means controls said switching gate part responsive to the detection of said specific input channel in said input signal detecting means so that said specific input channel is coupled to all of said output channels other than an output channel having a channel number corresponding to that of said specific input channel.

3. A node apparatus as claimed in claim 1 in which said control means further comprises signal producing means and fault storage means, said signal producing means producing an active signal from at least the output channel having the channel number corresponding to that of said first receiving input channel responsive to the detecton of said first receiving input channel in said first input detecting means, said active signal indicating that said node apparatus is operating normally and is active, said input signal detecting means detecting one of said arbitrary input channels which receives no signal during said first predetermined time, said fault storage means storing data indicative of said one of said arbitrary input channels detected in said input signal detecting means as receiving no signal during said first predetermined time.

4. A node apparatus as claimed in claim 3 in which said control means controls said switching gate part responsive to the data read out of said fault storage means so that said input channels are inhibited from coupling to an output channel having a channel number corresponding to that of said one input channel indicated by the read out data.

5. A node apparatus as claimed in claim 4 in which said control means controls said switching gate part responsive to the data read out of said fault storage means so that said one input channel indicated by the read out data is inhibited from coupling to output channels other than the output channel having the channel number corresponding to that of said one input channel indicated by the read out data.

6. A node apparatus as claimed in claim 1 in which said control means further comprises signal producing means and fault storage means, said signal producing means producing an active signal from the output channel having the channel number corresponding to that of said first receiving input channel responsive to the detection of said first receiving input channel in said first input detecting means, said active signal indicating that said node apparatus is operating normally and is active, said input signal detecting means detecting one of said arbitrary input channels which receives no signal during said first predetermined time, said fault storage means storing data indicative of said one of said arbitrary input channels detected in said input signal detecting means as receiving no signal during said first predetermined time.

7. A node apparatus as claimed in claim 6 in which said control means controls said switching gate part responsive to the data read out of said fault storage means so that said input channels are inhibited from coupling to an output channel having a channel number corresponding to that of said one input channel indicated by the read out data.

8. A node apparatus as claimed in claim 7 in which said control means controls said switching gate part responsive to the data read out of said fault storage means so that said one input channel indicated by the read out data is inhibited from coupling to output channels other than the output channel having the channel number corresponding to that of said one input channel indicated by the read out data.

9. A node apparatus as claimed in claim 1 in which said control means controls said switching gate part to couple each of said input channels to all of said output channels other than an output channel having a corresponding channel number when said control means detects an end of the signal received by said first receiving input channel.

10. A node apparatus as claimed in claim 1 in which said control means controls said switching gate part to couple each of said input channels to all of said output channels other than an output channel having a corresponding channel number when said control means detects both an end of the signal received by said first receiving input channel and an end of a signal received by said specific input channel.

11. A node apparatus as claimed in claim 1 in which said control means further comprises second time-out means for timing a third predetermined time when the signal received by said first receiving input channel takes a predetermined logic value, said control means controlling said switching gate part to couple each of said input channels to all of said output channels other than an output channel having a corresponding channel number when said signal maintains said predetermined logic value during said third predetermined time.

12. A node apparatus for a communication network having a multi-conjunction architecture, said communication network having a plurality of transmission paths each coupling one node apparatus to another node apparatus or a terminal device, said node apparatus comprising:
an input port comprising a plurality of input channels connected to the transmission paths;
an output port comprising a plurality of output channels connected to the transmission paths;
a switching gate part for coupling said input and output channels of said input and output ports; and
control means for controlling said switching gate part to selectively couple said input and output channels,
said control means comprising first input detecting means coupled to said input port for detecting a first receiving input channel which receives a signal first out of said input channels, first time-out means for timing a second predetermined time after a first predetermined time elapses from the detection of said first receiving input channel in said first input detecting means, and input signal detecting means coupled to said first time-out means for detecting whether or not said input channels receive a signal from the transmission paths,
said control means controlling said switching gate part to maintain said input and output channels coupled to each other in an initial state so that each input channel other than input channels included in a fixed communication path is coupled to all of said output channels other than an output channel having a corresponding channel number, said fixed communication path being a communication path in which a signal transmission is made and including a communication path which is fixed between an input channel and an output channel until the signal transmission ends,
said control means controlling said switching gate part responsive to the detection of said first receiving input channel in said first input detecting means so that all of said input channels other than said first receiving input channel are disconnected from said output channels, thereby transferring the signal received by said first receiving input channel to all of said output channels other than an output channel having a channel number corresponding to that of said first receiving input channel,
said input signal detecting means supervising whether or not a signal is received by arbitrary input channels having channel numbers corresponding to those of the output channels which transfer the signal received by said first receiving input channel, so as to detect specific ones of said arbitrary input channels which receive no signal during said second predetermined time and to detect a certain one of said specific input channels which receives a signal after said second predetermined time,
said control means controlling said switching gate part responsive to the detection of said certain input channel in said input signal detecting means so that said certain input channel is coupled to the output channel having the channel number corresponding to that of said first receiving input channel and said first receiving input channel is coupled to an output channel having a channel number corresponding to that of said certain input channel, thereby a communication path being fixed between said input and output ports, each of said input channels other than said first receiving input channel and said certain input channel being coupled to all of said output channels other than output channels having channel numbers corresponding to those of said first receiving input channel and said certain input channel.

13. A node apparatus as claimed in claim 12 in which said control means further comprises signal producing means and fault storage means, said signal producing means producing an active signal from at least the output channel having the channel number corresponding to that of said first receiving input channel responsive to the detection of said first receiving input channel in said first input detecting means, said input signal detecting means detecting out of input channels other than input channels included in a fixed communication path one of said arbitrary input channels which receives no signal during said first predetermined time, said fault storage means storing data indicative of said one of said arbitrary input channels detected in said input signal detecting means as receiving no signal during said first predetermined time.

14. A node apparatus as claimed in claim 13 in which said control means controls said switching gate part responsive to the data read out of said fault storage means so that said input channels other than the input channels included in the fixed communication path are inhibited from coupling to an output channel having a channel number corresponding to that of said one input channel indicated by the read out data.

15. A node apparatus as claimed in claim 14 in which said control means controls said switching gate part responsive to the data read out of said fault storage means so that said one input channel indicated by the read out data is inhibited from coupling to any of said output channels.

16. A node apparatus as claimed in claim 12 in which said control means controls said switching gate part to set the coupling between said input and output channels which are other than input and output channels included in a fixed communication path to said initial state when none of said specific input channels receive a signal after said second predetermined time and the signal received by said first receiving input channel ends.

17. A node apparatus as claimed in claim 12 in which said control means further comprises second time-out means for timing a third predetermined time when the signal received by said first receiving input channel ends, said control means controlling said switching gate part to set the coupling between said input and output channels which are other than input and output channels included in a fixed communication path to said initial state when none of said specific input channels receive a signal during said third predetermined time.

18. A node apparatus as claimed in claim 12 in which said control means controls said switching gate part to couple a pair of input channels included in a fixed communication path to all of said output channels which are other than output channels included in another fixed communication path and other than output channels having channel numbers corresponding to those of said pair of input channels when said control means detects an end of a signal received by either one of said pair of input channels, each of said input channels other than input channels included in a fixed communication path being coupled to all of said output channels other than an output channel having a channel number corresponding thereto but inclusive of the output channels having the channel numbers corresponding to those of said pair of input channels.

19. A node apparatus as claimed in claim 18 in which said control means further comprises second time-out means for timing a fourth predetermined time when the signal received by said first receiving input channel takes a predetermined logic value, said control means controlling said switching gate part to couple said pair of input channels to all of said output channels which are other than output channels included in another fixed communication path and other than output channels having channel numbers corresponding to those of said pair of input channels and to couple each of said input channels other than input channels included in a fixed communication path to all of said output channels other than an output channel having a channel number corresponding thereto but inclusive of the output channels having the channel numbers corresponding to those of said pair of input channels when said signal maintains said predetermined logic value during said fourth predetermined time.

20. A node apparatus as claimed in claim 12 in which said control means controls said switching gate part to couple a pair of input channels included in a fixed communication path to all of said output channels which are other than output channels included in another fixed communication path and other than output channels having channel numbers corresponding to those of said pair of input channels when said control means detects ends of signals received by both said pair of input channels, each of said input channels other than input channels included in a fixed communication path being coupled to all of said output channels other than an output channel having a channel number corresponding thereto but inclusive of the output channels having the channel numbers corresponding to those of said pair of input channels.

21. A node apparatus as claimed in claim 20 in which said control means further comprises second time-out means for timing a fourth predetermined time when the signal received by said first receiving input channel takes a predetermined logic value, said control means controlling said switching gate part to couple said pair of input channels to all of said output channels which are other than output channels included in another fixed communication path and other than output channels having channel numbers corresponding to those of said pair of input channels and to couple each of said input channels other than input channels included in a fixed communication path to all of said output channels other than an output channel having a channel number corresponding thereto but inclusive of the output channels having the channel numbers corresponding to those of said pair of input channels when said signal maintains said predetermined logic value during said fourth predetermined time.

* * * * *